(12) United States Patent
Yang et al.

(10) Patent No.: US 8,804,820 B2
(45) Date of Patent: Aug. 12, 2014

(54) RATE CONTROL WITH LOOK-AHEAD FOR VIDEO TRANSCODING

(75) Inventors: Kyeong H. Yang, Freehold, NJ (US); Ran Ding, Eatontown, NJ (US)

(73) Assignee: Dialogic Corporation, Montreal (CA)

( * ) Notice: Subject to any disclaimer, the term of this patent is extended or adjusted under 35 U.S.C. 154(b) by 274 days.

(21) Appl. No.: 13/091,414

(22) Filed: Apr. 21, 2011

(65) Prior Publication Data
US 2012/0269258 A1   Oct. 25, 2012

(51) Int. Cl.
| H04N 7/12 | (2006.01) |
| H04N 11/02 | (2006.01) |
| H04N 11/04 | (2006.01) |
| H04N 7/26 | (2006.01) |

(52) U.S. Cl.
CPC ... *H04N 19/00163* (2013.01); *H04N 19/00472* (2013.01); *H04N 19/0006* (2013.01); *H04N 19/00563* (2013.01); *H04N 19/0009* (2013.01); *H04N 19/00266* (2013.01); *H04N 19/00145* (2013.01); *H04N 19/00157* (2013.01)
USPC ............. 375/240.02; 375/240.12; 375/240.27

(58) Field of Classification Search
CPC ... H04N 7/5086; H04N 7/50; H04N 7/26244; H04N 7/26271; H04N 7/26053; H04N 7/26941
USPC .............................................. 375/240.03–26
See application file for complete search history.

(56) References Cited

U.S. PATENT DOCUMENTS

| 2005/0058198 A1* | 3/2005 | Zhao et al. ............... 375/240.03 |
| 2008/0232478 A1* | 9/2008 | Teng et al. ............... 375/240.27 |
| 2009/0086814 A1* | 4/2009 | Leontaris et al. ........ 375/240.02 |
| 2009/0086816 A1* | 4/2009 | Leontaris et al. ........ 375/240.03 |
| 2011/0002381 A1 | 1/2011 | Yang et al. |
| 2011/0090960 A1* | 4/2011 | Leontaris et al. ........ 375/240.12 |

OTHER PUBLICATIONS

"Video Transcoding Architectures and Techniques: An Overview", Anthony Vetro et al., IEEE Signal Processing Magazine, pp. 18-29, Mar. 2003.
"Overview of the H.264/AVC Video Coding Standard", Thomas Wiegand et al., IEEE Transactions on circuits and Systems for Video Technology, vol. 13, No. 7, pp. 560-576, Jul. 2003.
"Joint Rate Control with Look-Ahead for Multi-Program Video Coding", Lilla Boroczky et al., IEEE Transactions on Circuits and systems for Video Technology, vol. 10, No. 7, pp. 1159-1163, Oct. 2000.

\* cited by examiner

*Primary Examiner* — Dave Czekaj
*Assistant Examiner* — Tsion B Owens
(74) *Attorney, Agent, or Firm* — Chapin IP Law, LLC

(57) ABSTRACT

Systems and methods of transcoding video bitstreams that employ look-ahead approaches to enhance the overall perceptual quality of transcoded video information, communications, and entertainment delivered to an end user. The disclosed systems and methods of transcoding video bitstreams take into account the scene characteristics and the local coding complexity of video frames in a video sequence before performing bit allocations for the video frames, thereby significantly improving the perceptual quality of transcoded video delivered to the end user.

33 Claims, 14 Drawing Sheets

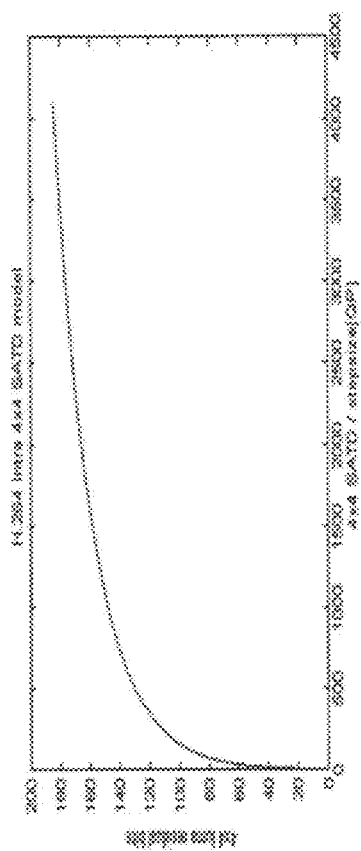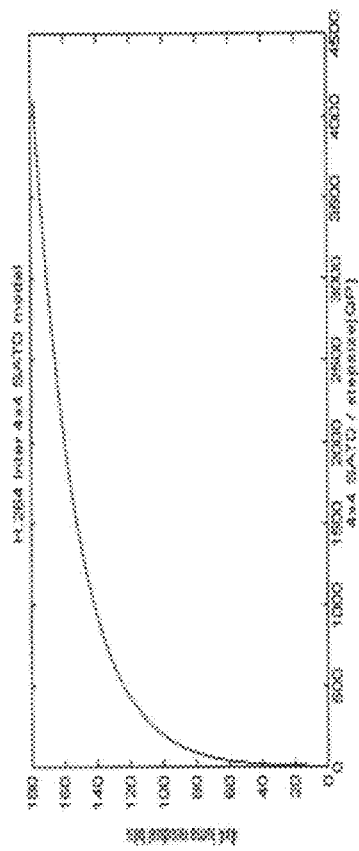
Fig. 6a
Fig. 6b

RATE CONTROL WITH LOOK-AHEAD FOR VIDEO TRANSCODING

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to systems and methods of transcoding video bitstreams, and more specifically to systems and methods of transcoding video bitstreams compressed according to the H.263 coding format, the H.264 coding format, and the MPEG-4 coding format, for use in multimedia applications including, but not limited to, video streaming and off-line video transcoding applications.

BACKGROUND OF THE INVENTION

There is an increasing need for systems and methods of transcoding video bitstreams due to the growing diversity of available multimedia applications, multimedia networks, video displays, and video coding formats. For example, the H.264 video coding format (also referred to herein as the "MPEG-4 Advanced Video Coding (AVC) format") has provided significant improvements in coding efficiency over earlier video coding standards, and has been widely employed in multimedia applications including, but not limited to, real-time video communications, video streaming, and off-line video transcoding applications. Because multimedia applications such as video streaming generally allow significant delays (e.g., up to 5 seconds or more) to be incorporated into the video transcoding process, some conventional video transcoding systems have employed so-called "look-ahead" approaches to video transcoding. For example, conventional video transcoding systems employing look-ahead approaches can use such delays allowed in video streaming to analyze "future" video frames in input video bitstreams (also referred to herein as the "input bitstreams"), and provide improved bit allocations for the video frames currently being transcoded, thereby enhancing the overall perceptual quality (also referred to herein as a/the "quality of experience" or "QoE") of transcoded video information, communications, and entertainment (also referred to herein as a/the "transcoded video") delivered to an end user. In general, for such conventional video transcoding systems employing look-ahead approaches, bit allocations for video frames normally improve as the number of future video frames available for analysis increases.

However, conventional video transcoding systems employing look-ahead approaches to video transcoding have several notable drawbacks. For example, such conventional video transcoding systems employing look-ahead approaches have heretofore not sufficiently taken into account scene characteristics before performing bit allocations for video frames. As a result, such conventional video transcoding systems frequently have difficulty in maintaining a consistent QoE throughout a sequence of video frames (also referred to herein as a/the "video sequence"), without having the QoE for the video sequence vary from video frame to video frame. Conventional video transcoding systems employing look-ahead approaches have also not sufficiently taken into account the local coding complexity of video frames, particularly when encoding bi-directionally predictive, inter-coded types of video frames (also referred to herein as the "B-frames"), resulting in further difficulties in maintaining a consistent QoE throughout a video sequence.

It would therefore be desirable to have improved systems and methods of transcoding video bitstreams that avoid at least some of the drawbacks of the conventional video transcoding systems and methods described above.

BRIEF SUMMARY OF THE INVENTION

In accordance with the present application, systems and methods of transcoding video bitstreams are disclosed that employ look-ahead approaches to video transcoding in multimedia applications such as video streaming and off-line video transcoding applications, thereby enhancing the overall perceptual quality (also referred to herein as a/the "quality of experience" or "QoE") of transcoded video information, communications, and entertainment (also referred to herein as a/the "transcoded video") delivered to an end user. Such systems and methods of transcoding video bitstreams take into account the scene characteristics and the local coding complexity of video frames in a video sequence before performing bit allocations for the video frames, significantly improving the QoE for transcoded video delivered to the end user.

In accordance with a first aspect, a system for transcoding video bitstreams that employs a look-ahead approach includes a look-ahead bitstream analyzer, a delay component, a video decoder, a decoder buffer, and a video encoder. The look-ahead bitstream analyzer is operative to receive, from an external video encoder, an input video bitstream (also referred to herein as an/the "input bitstream"), including a plurality of video frames compressed according to a first coding format. In accordance with an exemplary aspect, the plurality of video frames from the input bitstream comprise a plurality of YUV video frames, in which each YUV video frame comprises a plurality of macroblocks (also referred to herein as an/the "MB"). The look-ahead bitstream analyzer is further operative to analyze information such as slice layer information and/or MB layer information contained in the input bitstream, to generate an estimate of the coding complexity (also referred to herein as a/the "frame complexity") of each of at least some of the video frames in the input bitstream using at least some of the slice layer information and/or the MB layer information, and to provide the estimates of the frame complexities to the video encoder, resulting in a predetermined number of video frames of delay being incorporated into the input bitstream. The delay component is operative to receive the input bitstream from the external video encoder, and to incorporate the predetermined number of video frames of delay into the input bitstream before providing the delayed input bitstream to the video decoder. The video decoder is operative to decode the plurality of video frames in the input bitstream, and to provide decoded versions of the video frames to the decoder buffer. The video encoder is operative to read one or more series of the decoded versions of the video frames from the decoder buffer, to encode the series of video frames in accordance with a second coding format, using at least the estimates of the frame complexities of the video frames from the look-ahead bitstream analyzer, and to provide the encoded video frames in an output video bitstream (also referred to herein as an/the "output bitstream").

In accordance with another aspect, the video encoder includes a pre-processing component, a rate control component, a coding component, and a rate control update component. The pre-processing component is operative to determine, for each of at least some of the plurality of video frames, the type of the video frame, such as an intra-coded type of video frame (also referred to herein as an/the "I-frame"), a predictive, inter-coded type of video frame (also referred to herein as a/the "P-frame"), or a bi-directionally predictive, inter-coded type of video frame (also referred to herein as a/the "B-frame"). The pre-processing component is further operative to analyze each of at least some of the video frames, based at least on the video frame type. In accordance with an exemplary aspect, the pre-processing component is operative to calculate the luminance mean value of the video frame, and to perform intra prediction and/or inter prediction for each MB in the video frame. Such intra prediction, if performed, can be performed by the pre-processing component, and can include inferring signal levels representing pixels in a predictive MB in the video frame from signal levels representing pixels in adjacent MBs that have already been coded, and calculating differences between the signal levels to obtain residuals for a plurality of sub-macroblocks (also referred to herein as the "sub-blocks") in the video frame. Such inter prediction, if performed, can be performed by the pre-processing component, and can include integer pixel motion estimation to find an integer pixel accuracy motion vector that best predicts the current MB from a reference frame. Such inter prediction can further include calculating residuals for a plurality of MBs in the video frame by subtracting signal levels of prediction blocks in the reference frame from the signal levels of each MB. Based at least on such residuals for the plurality of sub-blocks in the video frame from the intra prediction, and such residuals for the plurality of MBs from the integer pixel motion estimation and motion compensated prediction, the pre-processing component is operative to select an intra coding mode or an inter coding mode for the video frame. The pre-processing component is further operative to store the luminance mean value of the video frame, and a local coding complexity value for each sub-block in the video frame. In further accordance with this exemplary aspect, the pre-processing component is operative to perform integer pixel motion estimation and intra prediction to select a coding mode for the video frame. Based at least on the difference between the luminance mean values for the current video frame and its reference frame, and/or the ratio of intra-coded MBs to inter-coded MBs for each of the video frames in the input bitstream, the pre-processing component is operative to detect a scene change in a video sequence including the video frame. Moreover, if it was determined that the video frame is a B-frame, indicating that the encoding order of the video frames may be different from the display order of the video frames, then the pre-processing component is further operative to store several video frames from the decoder buffer including the B-frame, and to reorder the video frames, as appropriate, for subsequent processing in the rate control component and the coding component.

In further accordance with this and/or other aspects, the rate control component is operative to receive analysis results for each video frame from the pre-processing component, and to determine whether or not the video frame is an I-frame. In the event it is determined that the video frame is an I-frame, the rate control component is further operative to form and initialize a group of pictures (also referred to herein as a/the "GoP") containing the I-frame. The rate control component is also operative to determine whether or not a scene change was detected in the video sequence, and to reset a predetermined rate control function if such a scene change was detected. Using at least the luminance mean value of the video frame, the local coding complexity value for each sub-block in the video frame, and/or the frame complexity of the video frame, the rate control component is operative to analyze characteristics of the video frame, and to set the B-frame rate in the output bitstream. The rate control component is further operative to perform bit allocation for the video frame using at least the frame complexity from the look-ahead bitstream analyzer, and to select a quantization parameter (also referred to herein as a/the "QP") appropriate for such a bit allocation, using at least the local coding complexity value for each sub-block in the video frame. Using at least the selected QP, the coding component is operative to encode the video frame, and to provide the encoded video frame in the output bitstream. In addition, the rate control update component is operative to update one or more rate estimation model parameters for the predetermined rate control function, and to update the frame complexity for the video frame, based at least on the selected QP and the actual number of bits used to encode the video frame.

By, among other things, taking into account the scene characteristics and the local coding complexity of video frames in a video sequence before performing bit allocations for the video frames, the disclosed systems and methods of transcoding video bitstreams employing look-ahead approaches to video transcoding can significantly improve the QoE for transcoded video delivered to an end user.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which:

FIG. 6a is a diagram illustrating an exemplary mapping of data representing intra 4×4 luma residual bits versus normalized 4×4 SATD cost generated using the exemplary rate control function implemented within the video encoder of FIG. 2;

FIG. 6b is a diagram illustrating an exemplary mapping of data representing inter 4×4 luma residual bits versus normalized 4×4 SATD cost generated using the exemplary rate control function implemented within the video encoder of FIG. 2;

DETAILED DESCRIPTION OF THE INVENTION

Systems and methods of transcoding video bitstreams are disclosed that employ look-ahead approaches to video transcoding to enhance the overall perceptual quality (also referred to herein as a/the "quality of experience" or "QoE") of transcoded video information, communications, and entertainment (also referred to herein as a/the "transcoded video") delivered to an end user. Such systems and methods of transcoding video bitstreams take into account the scene characteristics and the local coding complexity of video frames in a video sequence before performing bit allocations for the video frames, thereby significantly improving the QoE for transcoded video delivered to the end user.

Figure 1:
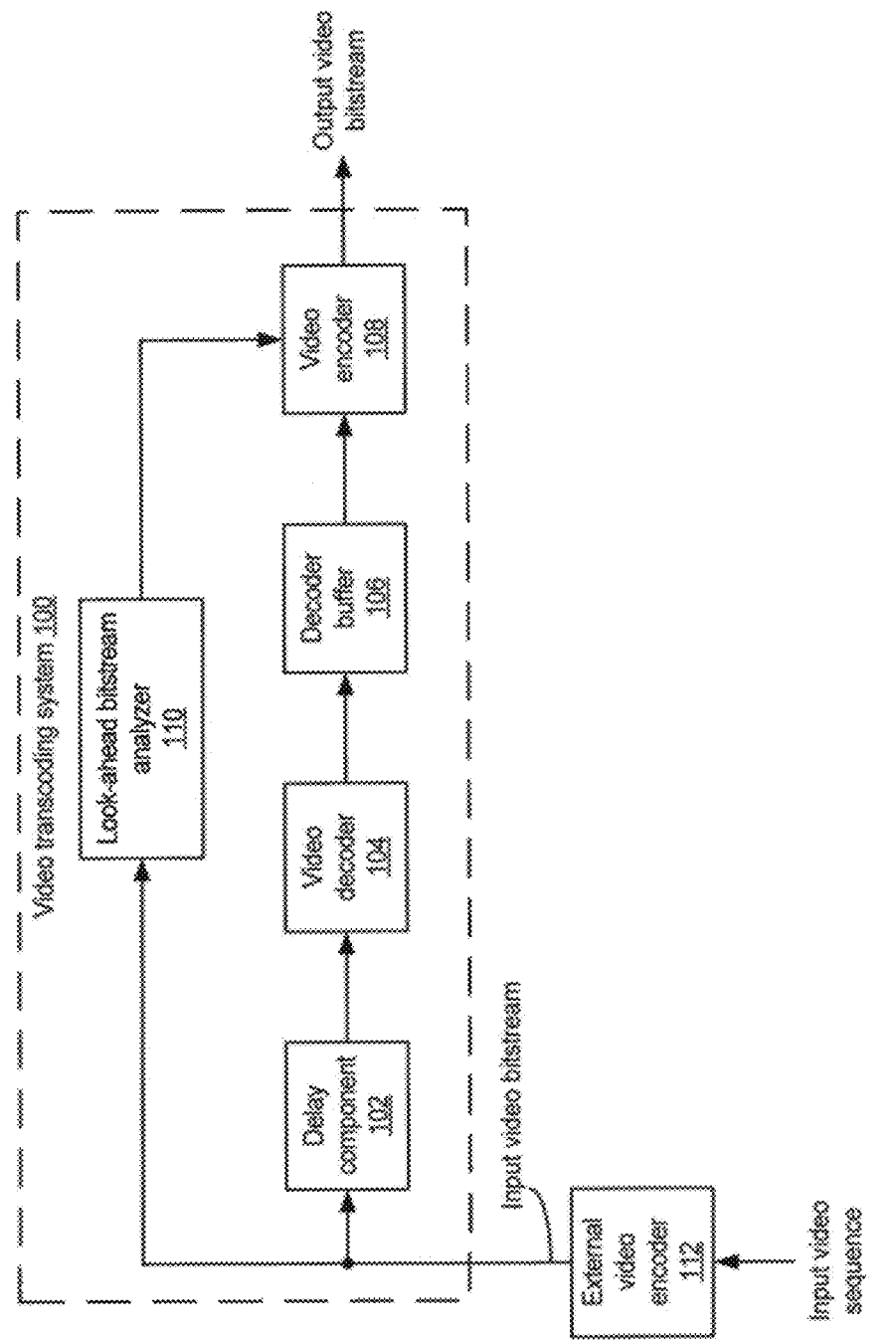
FIG. 1 is a block diagram of an exemplary video transcoding system that employs a look-ahead approach to video transcoding, in accordance with an exemplary embodiment of the present application.

FIG. 1 depicts an illustrative embodiment of an exemplary video transcoding system 100 that employs a look-ahead approach to video transcoding, in accordance with the present application. As shown in FIG. 1, the video transcoding system 100 includes a delay component 102, a video decoder 104, a decoder buffer 106, a video encoder 108, and a look-ahead bitstream analyzer 110. The look-ahead bitstream analyzer 110 is operative to receive an input video bitstream (also referred to herein as an/the "input bitstream") generated from an input video sequence (also referred to herein as an/the "input sequence") by an external video encoder 112. In one or more alternative embodiments, a video encoder like the external video encoder 112 may be incorporated into the video transcoding system 100. In accordance with the illustrative embodiment of FIG. 1, the input bitstream includes a plurality of video frames compressed according to a first coding format, such as the H.263 coding format, the H.264 coding format (also referred to herein as the "MPEG-4 Advanced Video Coding (AVC) format"), the MPEG-4 coding format, or any other suitable coding format. Further, the plurality of video frames included in the input bitstream may comprise a plurality of YUV video frames, or any other suitable type of video frame (also referred to herein as a/the "video frame type"). Each video frame comprises a plurality of macroblocks (also referred to herein as "MBs"), and each MB, in turn, comprises a plurality of sub-macroblocks (also referred to herein as "sub-blocks").

The look-ahead bitstream analyzer 110 is operative to analyze coding layer information such as slice layer information and/or MB layer information contained in the input bitstream. As employed herein, the term "slice" denotes a series of MBs in the same video frame. The look-ahead bitstream analyzer 110 is further operative to generate an estimate of the coding complexity (also referred to herein as a/the "frame complexity") of each of at least some of the plurality of video frames in the input bitstream using at least the slice layer information and/or the MB layer information, and to provide the estimates of the frame complexities to the video encoder 108, resulting in a predetermined number, N, of video frames of delay being incorporated into the input bitstream. Moreover, the delay component 102 is operative to receive the input bitstream from the external video encoder 112, to incorporate the predetermined number, N, of video frames of delay into the input bitstream, and to provide the delayed input bitstream to the video decoder 104. The video decoder 104 is operative to decode the plurality of video frames in the input bitstream, and to provide decoded versions of the video frames to the decoder buffer 106. The video encoder 108 is operative to read a series of the decoded versions of the one or more video frames from the decoder buffer 106, and to encode the series of video frames, using at least the estimates of the frame complexities of the respective video frames, in accordance with a second coding format, such as the H.263 coding format, the H.264 coding format, the MPEG-4 coding format, or any other suitable coding format. The video encoder 108 is further operative to provide the encoded video frames in an output video bitstream (also referred to herein as an/the "output bitstream").

Figure 2:
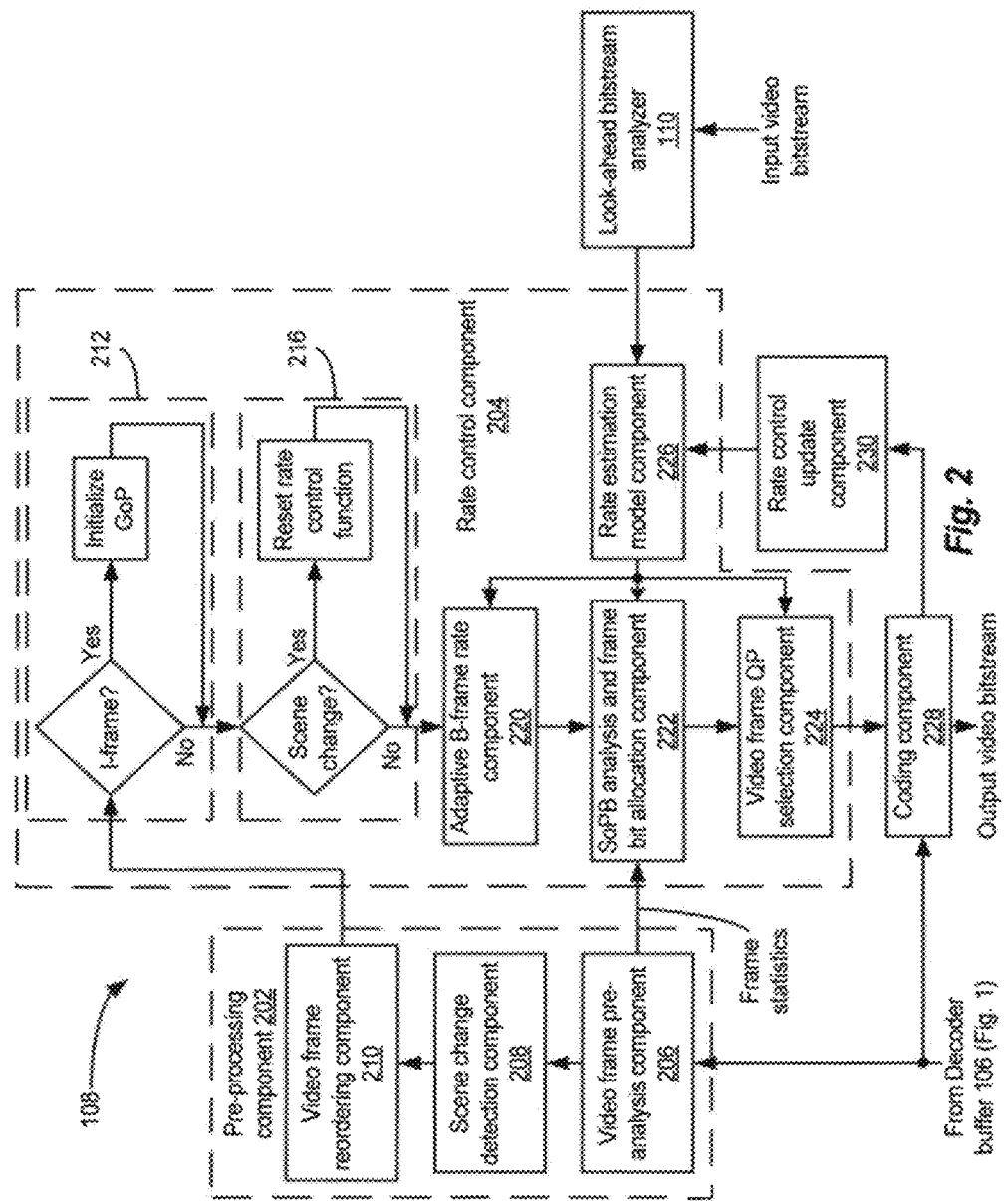
FIG. 2 is a block diagram of an exemplary video encoder included in the video transcoding system of FIG. 1.

FIG. 2 depicts an illustrative embodiment of the video encoder 108 included in the video transcoding system 100 of FIG. 1. As shown in FIG. 2, the video encoder 108 includes a pre-processing component 202, a rate control component 204, a coding component 228, and a rate control update component 230. As shown, the pre-processing component 202 can include a plurality of functional components, namely, a video frame pre-analysis component 206, a scene change detection component 208, and a video frame reordering component 210. Like the pre-processing component 202, the rate control component 204 can also include a plurality of functional components, such as the following:

1) a first functional component 212 operative to initialize a group of pictures (also referred to herein as a/the "GoP") in the event a current video frame being transcoded is determined to be an intra-coded type of video frame (also referred to herein as an/the "I-frame");

2) a second functional component 216 operative to reset a predetermined rate control function in the event a scene change is detected in the input sequence;

3) a third functional component 220 (also referred to herein as an/the "adaptive B-frame rate component 220") operative to adaptively set the rate of a bi-directionally predictive, inter-coded type of video frame (also referred to herein as a/the "B-frame") in the output bitstream;

4) a fourth functional component 222 (also referred to herein as an/the "SoPB analysis and frame bit allocation component 222") operative to analyze a set of video frames (also referred to herein as an/the "SoPB structure") in the output bitstream, including a predictive, inter-coded type of video frame (also referred to herein as a/the "P-frame"), or an I-frame, followed by one or more B-frames, and to perform bit allocation for the current video frame using the SoPB structure;

5) a fifth functional component 224 (also referred to herein as a/the "video frame QP selection component 224") operative to select a quantization parameter (also referred to herein as a/the "QP") appropriate for such a bit allocation for the current video frame; and 6) a sixth functional component 226 (also referred to herein as a/the "rate estimation model component 226") operative to implement one or more rate estimation model parameters used in a predetermined rate control function.

Specifically, the video frame pre-analysis component 206 within the pre-processing component 202 (see FIG. 2) is operative to determine, for each of at least some of the video frames in the input bitstream, the video frame type, such as an I-frame, a P-frame, or a B-frame, and to analyze the video frame, based at least on the video frame type. The video frame pre-analysis component 206 is further operative to calculate the luminance mean value of the video frame, and to perform intra prediction and/or inter prediction for each MB in the video frame. For example, such intra prediction, if performed, can be performed by the video frame pre-analysis component 206, and can include inferring signal levels representing pixels in a predictive MB in the video frame from signal levels representing pixels in adjacent MBs that have already been coded, and calculating differences between the signal levels to obtain residuals for a plurality of sub-blocks in the video frame. Such inter prediction, if performed, can be performed by the video frame pre-analysis component 206, and can include integer pixel motion estimation to find an integer pixel accuracy motion vector that best predicts the current MB from a reference frame. Such inter prediction can further include calculating residuals for a plurality of MBs in the video frame by subtracting signal levels of prediction blocks in the reference frame from the signal levels of each MB. Based at least on such residuals for the plurality of sub-blocks in the video frame from the intra prediction, and such residuals for the plurality of MBs from the integer pixel motion estimation and motion compensated prediction, the video frame pre-analysis component 206 is operative to select an intra coding mode or an inter coding mode for each MB in the video frame. The video frame pre-analysis component 206 is further operative to store the luminance mean value of the video frame, and to generate and store a local coding complexity value for each sub-block in the video frame.

Moreover, the scene change detection component 208 within the pre-processing component 202 is operative to read the luminance mean value for the video frame stored in the video frame pre-analysis component 206. Based at least on the difference in the luminance mean value between the current video frame and its reference frame and/or the ratio of intra-coded MBs to inter-coded MBs for the video frame, the scene change detection component 208 is further operative to detect a scene change in the input sequence. If it was determined that the video frame is a B-frame, indicating that the encoding order of the video frames may be different from the display order of the video frames, then the video frame reordering component 210 within the pre-processing component 202 is operative to store several video frames from the input bitstream including the B-frame, and to reorder the video frames, as appropriate, for subsequent processing in the rate control component 204 and the coding component 228.

In addition, the first functional component 212 within the rate control component 204 is operative to receive each video frame, and analysis results for the video frame, from the video frame reordering component 210, and to determine whether or not the video frame is an I-frame. In the event it is determined that the video frame is an I-frame, the first functional component 212 is further operative to form and initialize a GoP containing the I-frame. The second functional component 216 within the rate control component 204 is operative to determine whether or not a scene change was detected in the input sequence by the scene change detection component 208, and, in the event such a scene change was so detected, to reset one or more rate estimation model parameters used in the predetermined rate control function. The rate estimation model component 226 is operative to store one or more rate estimation model parameters and the estimates of the frame complexities, which are used in the adaptive B-frame rate component 220, the SoPB analysis and frame bit allocation component 222, and the video frame QP selection component 224.

Using at least the luminance mean value of the video frame, the local coding complexity value for each sub-block in the video frame, and/or the frame complexity of the video frame, the adaptive B-frame rate component 220 within the rate control component 204 is operative to analyze characteristics of the video frame (also referred to herein as the "video frame characteristics"), and to set the B-frame rate in the output bitstream. The SoPB analysis and frame bit allocation component 222 within the rate control component 204 is operative to perform bit allocation for the video frame using at least the frame complexity from the look-ahead bitstream analyzer 110. Further, using at least the local coding complexity value for each sub-block in the video frame, the video frame QP selection component 224 within the rate control component 204 is operative to select a QP that is appropriate for such a bit allocation. It is noted that the video frame QP selection component 224 can implement a slice layer rate control function, an MB layer rate control function, or any other suitable type of rate control function. For example, the video frame QP selection 224 may implement the rate control function described in co-pending U.S. patent application Ser. No. 12/497,110 filed Jul. 2, 2009, entitled A BITRATE CONTROL ALGORITHM FOR VIDEO TRANSCODING SYSTEMS, which is assigned to the same assignee of the present application, and which is incorporated herein by reference in its entirety.

Using at least the QP selected by the video frame QP selection component 224, the coding component 228 within the video encoder 108 (see FIG. 1) is operative to encode the video frame, and to provide the encoded video frame in the output bitstream. Moreover, based at least on the selected QP and the actual number of bits used by the coding component 228 to encode the video frame, the rate control update component 230 within the video encoder 108 is operative to update one or more rate estimation model parameters for the predetermined rate control function, which is implemented by the rate estimation model component 226 within the rate control component 204.

The illustrative embodiment of the video transcoding system 100 depicted in FIG. 1 will be further understood with reference to the following detailed description of the video encoder 108, including, as shown in FIG. 2, the pre-processing component 202, the rate control component 204, the coding component 228, and the rate control update component 230. As described herein, the video frame pre-analysis component 206 within the pre-processing component 202 can calculate the luminance mean value of each of at least some of the plurality of video frames in the input bitstream, perform intra prediction and/or inter prediction for each MB in the video frame, and perform integer pixel motion estimation for predicting motion data if an inter coding mode is selected for the video frame. In accordance with the illustrative embodiment of FIG. 2, the video frame pre-analysis component 206 is operative to analyze each of at least some of the video frames using 16×16 intra prediction and integer pixel motion estimation to determine the MB coding type (also referred to herein as an/the "MB type") and the MB complexity, and to implement a skip detection function. For example, if the video frame pre-analysis component 206 selects a coding mode having a motion vector that is close to a predicted motion vector, e.g., the difference between corresponding components of the two vectors is less than 1, and the sum of absolute differences (also referred to herein as an/the "SADs") for the MB is less than a predetermined skip threshold (also referred to herein as a/the "thr_skip"), then the MB is designated as a "skipped MB." Such a skipped MB corresponds to an MB in the video frame designated to be skipped in the video encoding process within the coding component 228.

In further accordance with the illustrative embodiment of FIG. 2, the predetermined skip threshold, thr_skip, is defined to be a function of QP, and may be expressed as $$thr\_skip = MB\_SKIP\_THRESHOLD * q\_stepsize[QP\_average-2], \quad (1)$$

in which "QP_average" is the average of QPs used in encoding P-frames in the current scene (such QPs are available from the video frame QP selection component 224), "q_stepsize [QP_average−2]" corresponds to the resulting quantization step-size when a QP equal to "QP_average−2" is used, and "MB_SKIP_THRESHOLD" is a constant value that may be set to 4, 6, 8, or any other suitable threshold value.

After performing intra prediction and/or inter prediction for each MB in the video frame, and making a coding mode decision based on the motion compensated prediction result, the video frame pre-analysis component 206 is operative to calculate and store a coding cost for each 4×4 sub-block of the MB in the video frame, using either the SADs or the sum of absolute transform differences (also referred to herein as an/the "SATDs") for the video frame. It is noted that the video frame pre-analysis component 206 is operative to generate frame statistics including statistics relating to such coding costs, and to provide such frame statistics to the SoPB analysis and frame bit allocation component 222. The video frame pre-analysis component 206 is further operative to weight each coding mode according to a predetermined weighting parameter. In accordance with the illustrative embodiment of FIG. 2, the video frame pre-analysis component 206 is operative to select an appropriate QP value to be used in calculating the predetermined weighting parameter, which is subsequently used by the video frame pre-analysis component 206 in the coding mode decision process. For example, if the selected QP value is too high, then the skip threshold, thr_skip, may be set too high, in accordance with equation (1) above. As a result, the video frame pre-analysis component 206 may designate an inordinate number of MBs in the video frame as skipped MBs.

In further accordance with the illustrative embodiment of FIG. 2, the video frame pre-analysis component 206 can select the appropriate QP value to be used in calculating the predetermined weighting parameter, as follows:

1) estimate the bit allocation for the video frame using the corresponding frame complexity from the look-ahead bitstream analyzer 110; and -continued 2) if (firstP after SC)
{
    norm_bits_MB = target_bits_per_MB *
    framerate_size_factor *
      scene_complexity_factor;
    pre_analysis_QP = 36 − log(norm_bits_MB /
    16.0) / log(1.07);
}
else
    pre_analysis_QP = QP_average, in which "firstP after SC" represents the first P-frame after a scene change in the input sequence, "target_bits_per_MB" corresponds to the target bits to be allocated per MB based on a current bit budget, "framerate_size_factor" is a predetermined factor based on the current frame rate and the current frame size, "scene_complexity_factor" corresponds to a predetermined scene complexity factor, "QP_average" is the average of QPs that are used in encoding P-frames in the current scene (such QPs are available from the video frame QP selection component 224), and "pre_analysis_QP" represents the selected QP value. In sum, for the first P-frame after a scene change is detected, the video frame pre-analysis component 206 can select the QP value based at least on the current bit budget, the current frame rate, the current frame size, and the predetermined scene complexity factor. For other video frames in the input sequence, the selected QP value can correspond to the average of QPs used in encoding P-frames in the current scene (such QPs are available from the video frame QP selection component 224).

As further described herein, the scene change detection component 208 within the pre-processing component 202 can detect a scene change in the input sequence, based at least on the luminance mean value for a video frame and/or the ratio of intra-coded MBs to inter-coded MBs for the video frame. In accordance with the illustrative embodiment of FIG. 2, the scene change detection component 208 is operative to perform such scene change detection using the frame statistics from the video frame pre-analysis component 206, thereby detecting whether or not a current video frame is from the same scene as one or more previous video frames in the input bitstream.

It is noted that such scene change detection can lead to the introduction of one or more I-frames. It is further noted that such scene change detection generally involves two aspects, namely, mean-value-based scene change detection, and motion-based scene change detection. With regard to the mean-value-based scene change detection aspect, the scene change detection component 208 can employ two predetermined threshold values, namely, a predetermined high threshold value, and a predetermined low threshold value. If the scene change detection component 208 determines that the difference in the luminance mean value between the current video frame and one of the previous video frames in the input bitstream is less than the predetermined low threshold value, then no scene change is detected. If the scene change detection component 208 determines that the difference in the luminance mean value between the current video frame and the previous video frame is greater than the predetermined high threshold value, then a scene change is detected. Otherwise, if the scene change detection component 208 determines that the difference between the luminance mean value for the current video frame and the previous video frame falls between the predetermined high and low threshold values, then the scene change detection component 208 can perform further analysis on the video frames, e.g., using motion-based scene change detection, to determine whether or not such a scene change is detected.

More specifically, it was described herein that the video frame pre-analysis component 206 can calculate the luminance mean value of each of at least some of the video frames, perform intra prediction and/or inter prediction for each MB in the video frame, and implement a skip detection function. In accordance with the illustrative embodiment of FIG. 2, the video frame pre-analysis component 206 is operative to count the number of intra predicted MBs and the number of inter predicted MBs in the video frame, and to detect a scene change if the video frame contains significantly more intra predicted MBs than inter predicted MBs. Accordingly, the scene change detection component 208 is operative to detect a scene change in an input sequence as follows:

1) if the luminance mean value difference is greater than the predetermined high threshold value, then the video frame is deemed to be indicative of a scene change;

2) if the luminance mean value difference is less than the predetermined low threshold value, then the video frame is regarded as being in the same scene as the previous video frame in the input sequence; and 3) if the luminance mean value difference is between the predetermined high threshold value and the predetermined low threshold value, then the scene change detection component 208 is operative to compare the number of intra predicted MBs to the number of inter predicted MBs in the video frame. If the number of intra predicted MBs is greater than a predetermined percentage of the total number of MBs in the video frame, then the video frame is deemed to be indicative of a scene change. If the number of intra predicted MBs is less than the predetermined percentage of the total number of MBs in the video frame, then the video frame is regarded as being in the same scene as the previous video frame in the input sequence. For example, the predetermined percentage of the total number of MBs in the video frame may be set to 75, or any other suitable percentage value.

It was further described herein that the adaptive B-frame rate component 220 within the rate control component 204 can analyze the video frame characteristics, and set the B-frame rate in the output bitstream based on the video frame characteristics. Such setting of the B-frame rate in the output bitstream can be beneficial in instances such as when the respective frame complexities of the video frames change. For example, if a scene is simple with minimal motion, then using additional B-frames in the output bitstream can improve the overall perceptual quality. Alternatively, if a scene is more complicated and has a high degree of motion, then using fewer B-frames in the output bitstream can improve the overall perceptual quality. In accordance with the illustrative embodiment of FIG. 2, the adaptive B-frame rate component 220 is operative to adaptively change the number of B-frames between two I-frames or P-frames in the output bitstream based on the local coding complexity. For example, during video transcoding, the adaptive B-frame rate component 220 may calculate historical local coding complexity values for the respective sub-blocks in at least some of the video frames, and update the frame statistics generated from the previous video frames. Further, for a current video frame, the adaptive B-frame rate component 220 may employ the local coding complexity values for the video frame to determine the B-frame rate to be used for the next several video frames in the output bitstream. Accordingly, the adaptive B-frame rate component 220 can set the B-frame rate in the output bitstream, as follows:

1) first, after encoding each I-frame or P-frame, the adaptive B-frame rate component 220 calculates the local coding complexity of the current frame (also referred to herein as a/the "complexity_current"), using the number of MBs encoded in the I4×4 mode (also referred to herein as a/the "Num_I4×4Mode"), the number of MBs encoded in the I16×16 mode (also referred to herein as a/the "Num_I16×16Mode"), the number of motion vector bits for the current frame (also referred to herein as a/the "MV_Bits"), and the total number of MBs in the current frame (also referred to herein as a/the "num_MBs"). For example, the complexity_current may be expressed as $$\text{complexity\_current}=(MV\_Bits+20*Num\_I4\times 4Mode+10*Num\_I16\times 16Mode)/num\_MBs. \quad (2)$$

2) It is noted that the complexity_current can be highly dependent on QP, which may be different from one video frame to another video frame. For this reason, the adaptive B-frame rate component 220 normalizes the complexity_current for a predetermined QP value, such as a QP value of 26, or any other suitable QP value. For example, such a normalized complexity_current may be expressed as $$\text{complexity\_current}*=\text{power}(1.15,(QP\_average-26)). \quad (3)$$

3) Using the normalized local coding complexity of the current frame (complexity_current), the adaptive B-frame rate component 220 updates the average local complexity (also referred to herein as a/the "complexity_avg") by a predetermined weighted average. For example, the updated complexity_avg may be expressed as $$\text{complexity\_avg}=0.6*\text{complexity\_avg}+0.4*\text{complexity\_current}. \quad (4)$$

4) Using the updated average complexity (complexity_avg) and the frame complexity from the look-ahead bitstream analyzer 110 (also referred to herein as a/the "frame_complexity_from_lookahead"), the adaptive B-frame rate component 220 calculates a weighted complexity (also referred to herein as a/the "weighted_complexity"), which may be expressed as $$\text{weighted\_complexity}=\text{complexity\_avg}*24.0+\text{frame\_complexity\_from\_lookahead}. \quad (5)$$

5) The adaptive B-frame rate component 220 compares the weighted_complexity to a plurality of predetermined threshold values, such as two predetermined threshold values, Thre1 and Thre2, and determines the B-frame rate to be used for future video frames in the output bitstream. For example, if the weighted_complexity is greater than the predetermined threshold value, Thre2, then the adaptive B-frame rate component 220 can set the B-frame rate such that 1 B-frame is used. If the weighted_complexity is between the predetermined threshold values, Thre1 and Thre2, then the adaptive B-frame rate component 220 can set the B-frame rate such that 2 B-frames are used. If the weighted_complexity is less than the predetermined threshold value, Thre1, then the adaptive B-frame rate component 220 can set the B-frame rate such that 3 B-frames are used. For example, the predetermined threshold values, Thre1 and Thre2, may be set to 175 and 512, respectively, or any other suitable threshold values.

As described herein, the SoPB analysis and frame bit allocation component 222 within the rate control component 204 can analyze at least one SoPB structure in the input bitstream, and perform bit allocation for a current video frame using the SoPB structure. It is noted that if such bits are not allocated appropriately in view of the scene characteristics, then the perceptual quality of the transcoded video may fluctuate, resulting in a less than optimal QoE for transcoded video delivered to the end user. To improve the perceptual quality when B-frames are used in the output bitstream, the SoPB analysis and frame bit allocation component 222 is operative to perform such analysis and bit allocation using at least one SoPB structure, each SoPB structure including the current video frame (P-frame or I-frame), followed by one or more B-frames before the next I-frame or P-frame. The formation of each SoPB structure is based on the scene characteristics not changing significantly within 3 or 4 video frames in the input sequence. By analyzing the video frames in each SoPB structure together, smoother bit allocation and QP fluctuation can be achieved, at least across the video frames within the SoPB structure.

It is noted that the number of B-frames in each SoPB structure is determined by the B-frame rate, which, as described herein, is set by the adaptive B-frame rate component 220 within the rate control component 204. For example, if the B-frame rate is set to 2, then the encoding order of the video frames may be IPBBPBBPBBPBB, in which "I" represents an I-frame, "P" represents each P-frame, and "B" represents each B-frame, in the encoding order. Further, each group of frames, PBB, in the encoding order forms a respective SoPB structure. In accordance with the illustrative embodiment of FIG. 2, the SoPB analysis and frame bit allocation component 222 is operative to analyze the complexity of each of at least some of the video frames in the current SoPB structure, to allocate bits to the video frames to obtain a smooth perceptual quality, and to compress the video frames in the SoPB structure, one-by-one, or in any other suitable fashion. The SoPB analysis and frame bit allocation component 222 is operative to perform such a process of analyzing the SoPB and allocating bits to the SoPB when it finds an I-frame or a P-frame to be encoded.

Figure 3:
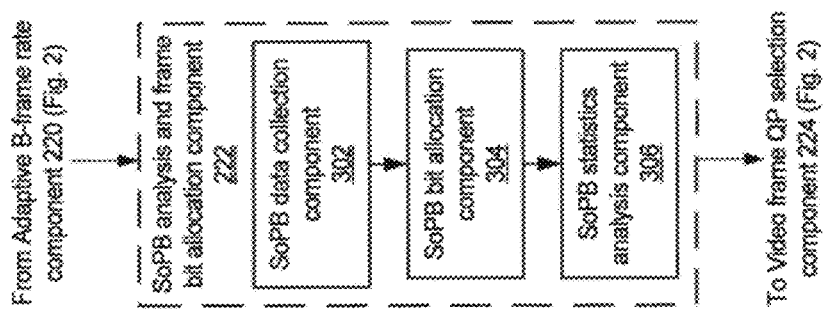
FIG. 3 is a detailed view of an exemplary Set of a P-frame followed by one or more B-frames (SoPBs) analysis and frame bit allocation component included in the video encoder of FIG. 2.

FIG. 3 depicts an illustrative embodiment of the SoPB analysis and frame bit allocation component 222 within the rate control component 204 of FIG. 2. As shown in FIG. 3, the SoPB analysis and frame bit allocation component 222 includes an SoPB data collection component 302, an SoPB bit allocation component 304, and an SoPB statistics analysis component 306. As described herein, the look-ahead bitstream analyzer 110 (see FIG. 1) can provide the estimates of the frame complexities to the video encoder 108 (see FIG. 1). For example, the rate estimation model component 226 (see FIG. 2) can receive the estimates of the frame complexities from the look-ahead bitstream analyzer 110, and can include a buffer for storing a predetermined number of the frame complexity estimates. The SoPB analysis and frame bit allocation component 222 can sum the estimates of the frame complexities of the predetermined number of video frames stored in the buffer within the rate estimation model component 226 to obtain a total frame complexity (also referred to herein as a/the "total_complexity"), and calculate the total number of bits allocated (also referred to herein as a/the "total_allocated_bits") to encode the video frames in its buffer, as follows:

$$\text{total\_allocated\_bits} = (\text{target\_bit\_rate} * \text{duration\_frames\_in\_look\_ahead\_buffer}), \quad (6)$$

in which "target_bit_rate" corresponds to the target bit rate, and "duration_frames_in_look_ahead_buffer" corresponds to the time duration, in seconds, associated with the video frames stored in the buffer.

The SoPB data collection component 302 within the SoPB analysis and frame bit allocation component 222 is operative to read, from the rate estimation model component 226, the frame complexity information for the video frames in the current SoPB structure, and to accumulate the frame complexity information to obtain the complexity of the current SoPB structure (also referred to herein as a/the "SoPB_complexity"). The SoPB bit allocation component 304 within the SoPB analysis and frame bit allocation component 222 is operative to allocate bits to the current SoPB structure as a weighted portion of the total_allocated_bits. For example, such a weighted portion may correspond to the SoPB_complexity divided by the total_complexity. Accordingly, the number of bits allocated to the current SoPB structure (also referred to herein as a/the "SoPB_bits_alloc") may be expressed as $$\text{SoPB\_bits\_alloc} = \text{total\_allocated\_bits} * (\text{SoPB\_complexity}/\text{total\_complexity}). \quad (7)$$

Moreover, the SoPB statistics analysis component 306 within the SoPB analysis and frame bit allocation component 222 is operative to analyze the statistics of the current SoPB structure, and to allocate bits to each of the P-frame and the B-frames in the current SoPB structure. It is noted that, when the P-frame in a group of frames, PBB, is encoded, the SoPB statistics analysis component 306 is operative to revise the estimates of the complexities of the video frames in the current SoPB structure using the distance to a predetermined reference frame, and the actual encoding statistics from one or more previous SoPB structures, including the average QP, the average number of bits, and the 4×4 SATD of the P-frames and the B-frames in the previous SoPB structures, thereby obtaining a weight of the complexities of the B-frames. The SoPB statistics analysis component 306 is further operative to allocate bits to the P-frame being encoded, based on the bits allocated to the current SoPB structure (SoPB_bits_alloc), and the revised estimates of the complexities of the video frames in the current SoPB structure, while maintaining a predetermined relationship in QP between the P-frame and the B-frames in the current SoPB structure. For example, the predetermined relationship in QP between the P-frame and the B-frames in the current SoPB structure may be expressed as $$QP_B - QP_P = DQP_{PB}, \quad (8)$$

in which "$QP_B$" is the quantization parameter for the B-frames, "$QP_P$" is the quantization parameter for the P-frame, and "$DQP_{PB}$" is the difference between $QP_B$ and $QP_P$. For example, $DQP_{PB}$ may be 5, or any other suitable difference value.

In accordance with the illustrative embodiment of FIG. 3, the SoPB statistics analysis component 306 is operative to analyze the statistics of the current SoPB structure, and to allocate the bits to each of the P-frame and the B-frames in the current SoPB structure, as follows:

1) Collect statistics of previously encoded SoPB structures, including the average QP for each of at least some of the video frames, i (also referred to herein as a/the "QP_average[i]"), the number of bits generated for the video frame, i (also referred to herein as a/the "bits_frame[i]"), and the average MB coding cost for the video frame, i (also referred to herein as a/the "MBCost_average[i]") from the video frame pre-analysis component 206, and analyze the SoPB_complexity considering such frame statistics for the video frame.

2) Calculate a parameter (also referred to herein as a/the "BP_statratio") that estimates the ratio of B-frame complexity to P-frame complexity when $QP_B$ is equal to the sum of $QP_P$ and $DQP_{PB}$, and adjust the average bits for the B-frames (also referred to herein as an/the "avg_bits_B") to the equivalent bits for the sum of $QP_P$ and $DQP_{PB}$, as follows, $$\text{avg\_bits\_}B\_\text{adjusted} = \text{avg\_bits\_}B * 1.15^{(\text{actual\_}BP\_QP\_\text{diff} - DQPPB)}, \quad (9)$$

in which "avg_bits_B_adjusted" corresponds to the adjusted average bits for the B-frames, and "$1.15^{(actual\_BP\_QP\_diff-DQP_{PB})}$" corresponds to the equivalent bits for the sum of $QP_P$ and $DQP_{PB}$. It is noted that the value, 1.15, is employed in equation (9) above based on the bits increasing by about 15% when the QP decreases by 1; however, any other suitable value may be employed accordingly.

3) Divide the P-frame bits (also referred to herein as a/the "bits_P") by the avg_bits_B_adjusted to obtain the ratio of the bits_P to the avg_bits_B (also referred to herein as a/the "PB_bits_ratio"), as follows, $$PB\_bits\_ratio = bits\_P / avg\_bits\_B\_adjusted. \quad (10)$$

Further, divide the average SATD of the P-frames (also referred to herein as an/the "avg_satd_P") by the average SATD of the B-frames (also referred to herein as an/the "avg_satd_B") to obtain the ratio of the avg_satd_P to the avg_satd_B (also referred to herein as a/the "PB_satd_ratio"), as follows, $$PB\_satd\_ratio = avg\_satd\_P / avg\_satd\_B, \quad (11)$$

and calculate the actual BP_statratio (also referred to herein as an/the "actual_BP_statratio"), as follows, $$actual\_BP\_statratio = (PB\_satd\_ratio / PB\_bits\_ratio) / (avg\_satd\_B / 10000.0). \quad (12)$$

4) Adapt the BP_statratio using the actual_BP_statratio, and update the current B-frame SATD (also referred to herein as a/the "currSoPB_B_satd") and the total SATD for B-frames (also referred to herein as a/the "tot_B_satd"), as follows, $$BP\_statratio = 0.75 * BP\_statratio + 0.25 * actual\_BP\_statratio, \quad (13)$$

$$currSoPB\_B\_satd* = BP\_statratio * frame\_avg\_satd / 10000, \text{ and} \quad (14)$$

$$tot\_B\_satd += currSoPB\_B\_satd, \quad (15)$$

in which "frame_avg_satd" corresponds to the average of the SATDs for all of the previously encoded video frames.

5) Allocate the bits given in equation (7) above to the P-frame and the B-frames, as follows, $$Bbits\_alloc = SoPB\_bits\_alloc * (currSoPB\_B\_satd / (tot\_B\_satd + P\_satd)), \text{ and} \quad (16)$$

$$Pbits\_alloc = SoPB\_bits\_alloc * (P\_satd / (tot\_B\_satd + P\_satd)), \quad (17)$$

in which "Bbits_alloc" corresponds to the bits allocated to the B-frames, "Pbits_alloc" corresponds to the bits allocated to the P-frame, and "P_satd" corresponds to the SATD for the P-frame.

Figure 4:
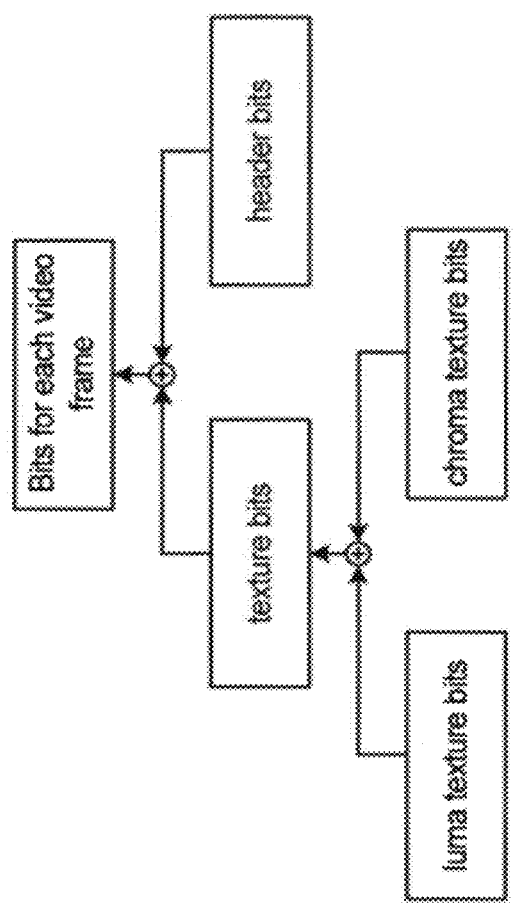
FIG. 4 is a diagram illustrating an exemplary configuration of bits in an exemplary video frame, for use in an exemplary video encoding process performed by the video encoder of FIG. 2.

It was described herein that the video frame QP selection component 224 within the rate control component 204 (see FIG. 2) can implement a predetermined rate control function, such as a slice layer rate control function, an MB layer rate control function, or any other suitable type of rate control function. It is noted that the bits for the video frames are typically estimated in a rate control function in two parts, namely, texture bits and header bits, in which the header bits include motion vector bits. In the illustrative embodiment of FIG. 2, the predetermined rate control function is operative to split or partition the texture bits for a video frame into two parts, namely, luma texture bits and chroma texture bits, as depicted in FIG. 4. By estimating the bits for a video frame using the texture bits and the header bits, and splitting or partitioning the texture bits into the luma texture bits and the chroma texture bits, the predetermined rate control function can better characterize the video frame for more accurate bit estimation.

It is further noted that the SATD values for each MB (16 4×4 sub-blocks in each MB in an exemplary formation of sub-blocks) in a video frame are typically used to estimate bits for an intra or inter prediction residual signal. However, the sum of SATD values for all of the MBs in the video frame can sometimes fail to estimate such bits accurately. For this reason, the predetermined rate control function implemented by the video frame QP selection component 224 is further operative to map each SATD value to bits using, e.g., a look-up table, before summing the SATD values, as follows, $$SATDModel\_intra[satd\_cost] = SATD\_intra\_bits, \text{ and} \quad (18)$$

$$SATDModel\_inter[satd\_cost] = SATD\_inter\_bits, \quad (19)$$

in which "SATDModel_intra [satd_cost]" corresponds to the SATD value for an intra prediction residual signal (e.g., a 4×4 SATD in an intra predicted MB), "SATDModel_inter [satd_cost]" corresponds to the SATD value for an inter prediction residual signal (e.g., a 4×4 SATD for an inter predicted MB), "SATD_intra_bits" corresponds to an estimated number of bits for the intra prediction residual signal, "SATD_inter_bits" corresponds to an estimated number of bits for the inter prediction residual signal, and "satd_cost" corresponds to the 4×4 SATD normalized by the quantization step-size. For example, the size of the look-up table may be equal to 4,096, or any other suitable size.

Figure 5:
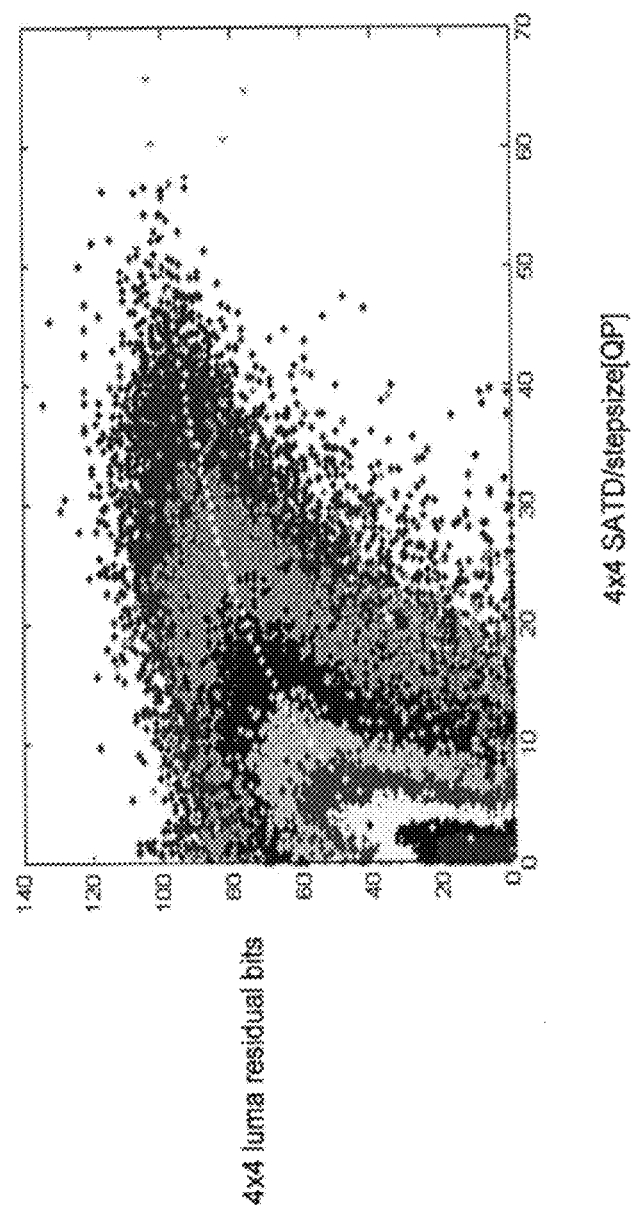
FIG. 5 is a diagram illustrating exemplary data representing inter 4×4 sub-macroblock bits versus normalized 4×4 SATD cost generated using an exemplary rate control function implemented within the video encoder of FIG. 2.

To use the predetermined rate control function, the video frame QP selection component 224 is operative to calculate the 4×4 SATD of each MB in a video frame using different QP values, and to sum up the luma texture bits for the video frame. For example, the 4×4 SATD values may be stored in the video frame pre-analysis component 206. FIG. 5 depicts a graph illustrating the inter 4×4 sub-block bits versus the normalized 4×4 SATD cost, in which the vertical axis corresponds to the bits for a 4×4 sub-block, and the horizontal axis corresponds to a 4×4 SATD normalized by the quantization step-size associated with the QP. It is noted that the dots in the graph of FIG. 5 represent training sample data, and the curve in the graph of FIG. 5 corresponds to the look-up table in the region of interest. Further, FIG. 6a depicts an illustrative mapping of intra predicted 4×4 sub-block bits versus the normalized 4×4 SATD cost, and FIG. 6b depicts an illustrative mapping of inter predicted 4×4 sub-block bits versus the normalized 4×4 SATD cost.

As described herein, the bits for a video frame can include not only luma texture bits, but also chroma texture bits, and header bits, which, in turn, can include MB header bits, slice header bits, and frame header bits. In accordance with the illustrative embodiment of FIG. 2, the rate estimation model parameters implemented by the rate estimation model component 226 are represented by a linear model in the form of $$frame\_total\_bits = alpha * texture\_bits + frame\_header\_bits, \quad (20)$$

in which "texture_bits" represents the estimated number of bits from the SATD model for luma texture bits and chroma texture bits, "alpha" is a rate estimation model parameter (also referred to herein as a/the "model parameter") used to model the texture bits and is typically close to 1, "frame_header_bits" represents the header bits used for the video frame, and "frame_total_bits" represents the total number of bits in the video frame. It is noted that "alpha*texture_bits" corresponds to the number of texture bits in the video frame.

Figure 7:
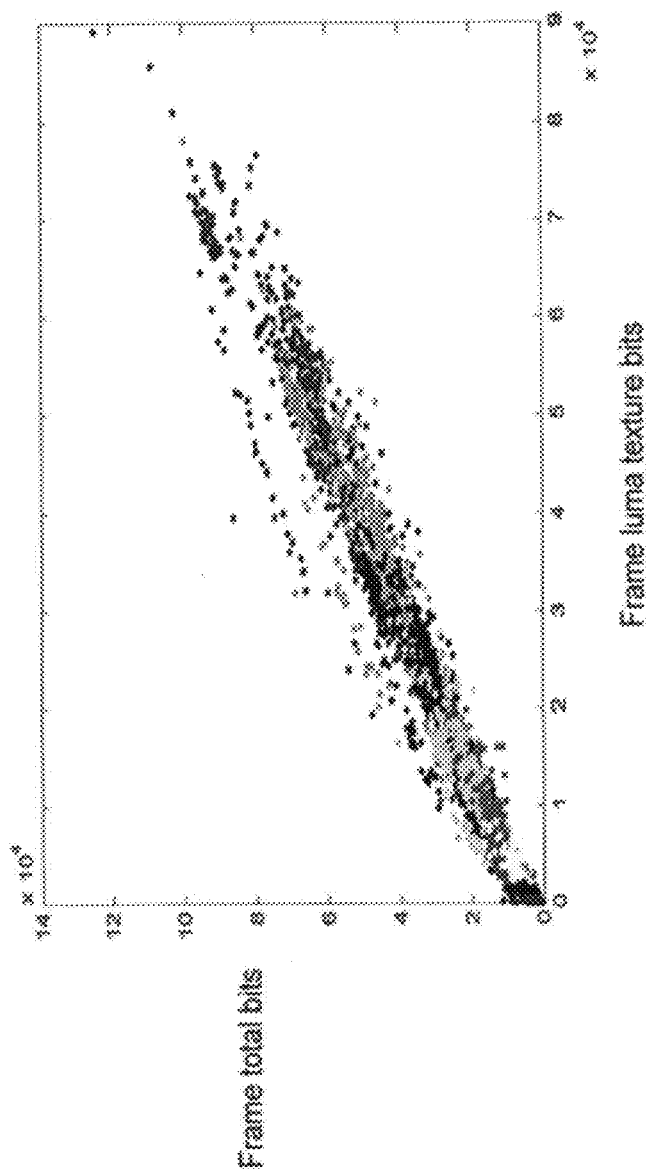
FIG. 7 is a diagram illustrating exemplary data representing P-frame total bits versus texture bits generated using the exemplary rate control function implemented within the video encoder of FIG. 2.

FIG. 7 depicts exemplary data collected for modeling the P-frame bits versus the texture bits, using the rate estimation model parameters implemented by the rate estimation model component 226. As shown in FIG. 7, the vertical axis corresponds to the total bits in the video frame, and the horizontal axis corresponds to the luma texture bits in the video frame. Further, the slope of the data depicted in FIG. 7 corresponds to the model parameter, alpha. As further shown in FIG. 7, because the model parameter estimation error is effectively averaged out when summing the MB bits to calculate the video frame bits, the distribution of the data tends to be converged. Accordingly, the model parameter, alpha (corresponding to the slope of the data depicted in FIG. 7), is stable enough to be employed as an initialization value for the first video frame after a scene change.

Figure 8:
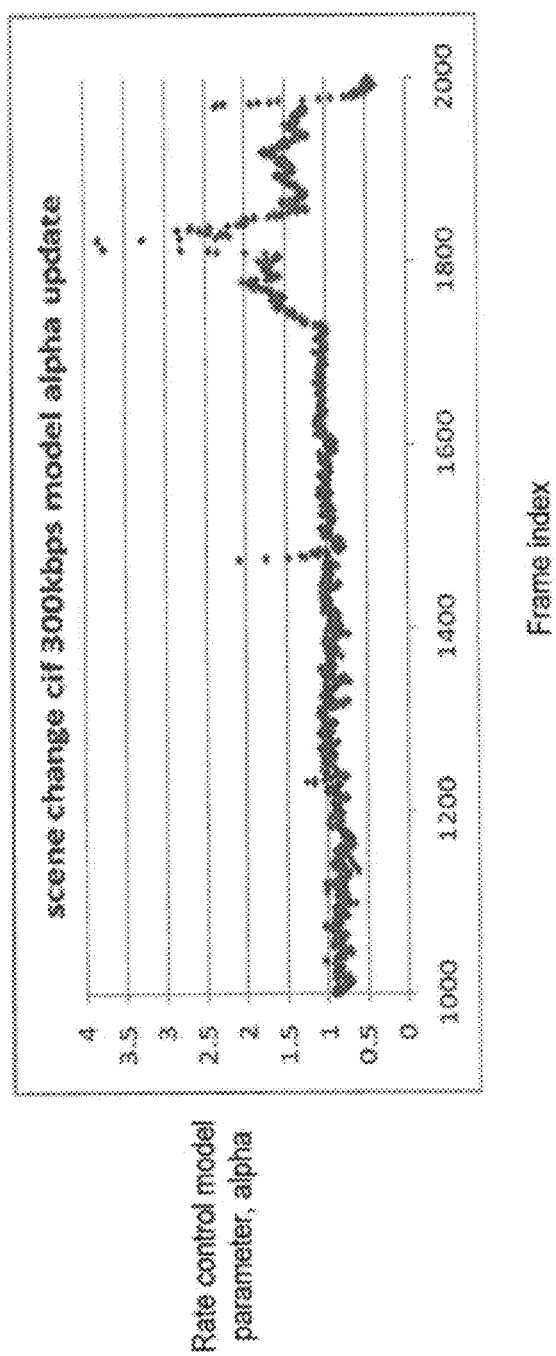
FIG. 8 is a graph illustrating an exemplary updating of an exemplary rate estimation model parameter, alpha, for the exemplary rate control function implemented within the video encoder of FIG. 2.

To increase the accuracy of the bit estimation performed by the video frame QP selection component 224, the model parameter, alpha, can be adjusted by the actual statistics of a current scene at the end of encoding a video frame in the current scene, using the actual texture bits collected during encoding of the video frame. The model parameter, alpha, can then be updated by a weighted average, using both a current model parameter, alpha, and the model parameter, alpha, used in encoding the previous video frame. FIG. 8 depicts an exemplary updating of the model parameter, alpha, for an exemplary video sequence transcoded at about 300 kbps.

Figure 9:
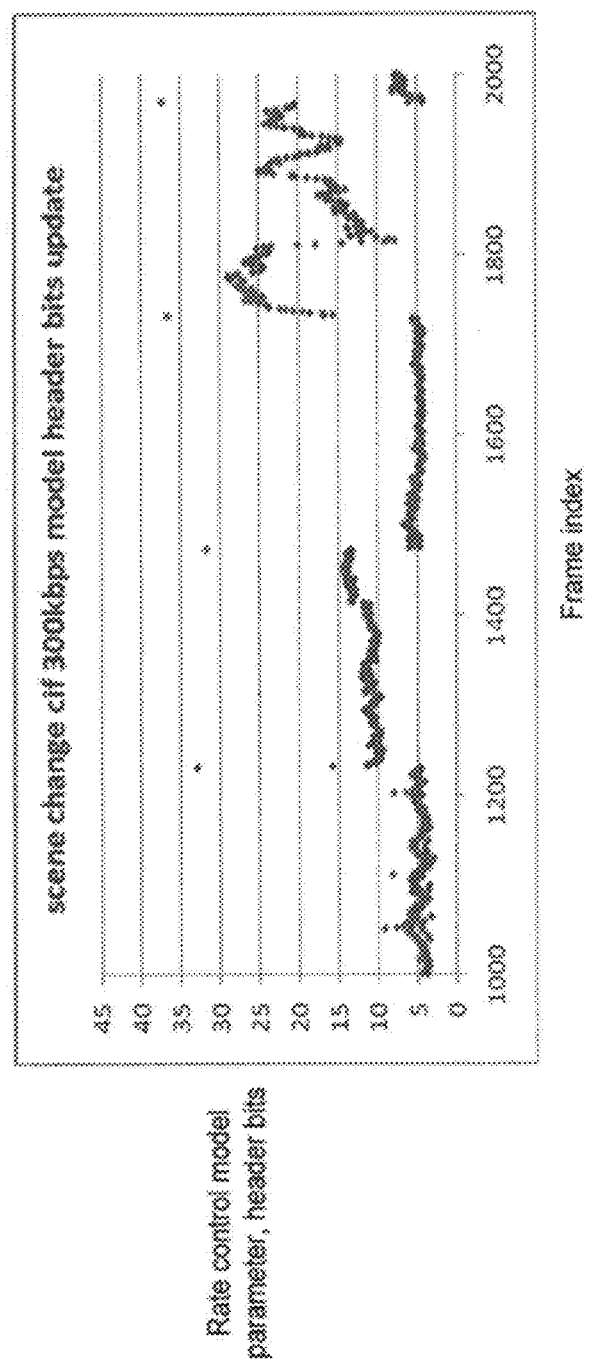
FIG. 9 is a graph illustrating an exemplary updating of another exemplary rate estimation model parameter, header bits, using the exemplary rate control function implemented within the video encoder of FIG. 2.

It is noted that the content of some video frames may include a high degree of motion, resulting in an increased number of header bits for the video frames. Further, the content of other video frames may include little motion, resulting in a decreased number of header bits for the video frames. Unlike texture bits, such header bits are typically not closely related to either the complexity of the video content or the quantization parameter. For this reason, the header bits for a video frame can also be updated to further increase the accuracy of the bit estimation, by training a video sequence to obtain initial header bits, and adapting the quantization parameter to current scene characteristics using a weighted average of the header bits for a current video frame (collected from actual encoding), and the header bits for previously encoded video frames. FIG. 9 depicts an exemplary updating of the header bits for an exemplary video sequence transcoded at about 300 kbps. As shown in FIG. 9, the header bits tend to be highly dependent on the content of the video frames.

In accordance with the illustrative embodiment of FIG. 2, one function of the predetermined rate control function implemented by the video frame QP selection component 224 is to select a quantization parameter suitable for the target bits to be allocated per MB in a video frame, while preventing overflow and underflow of the video encoder buffer (not shown). To select such a quantization parameter, the predetermined rate control function can test a plurality of QPs within a range of QPs, based on the QP for the predetermined reference frame. Specifically, for a given QP, the predetermined rate control function calculates the texture_bits (see also equation (20) above) by summing the bits for each 4×4 sub-block in each MB in the video frame, using equations (18) and (19) above for intra predicted MBs and inter predicted MBs, respectively. Taking the quality of the predetermined reference frame (also referred to herein as a/the "weight_reference_quality") into account, the predetermined rate control function applies the model parameter, alpha, to obtain the final estimation of the texture_bits, as follows, $$\text{texture\_bits} = \text{alpha} * \text{texture\_bits} * \text{weight\_reference\_quality}. \quad (21)$$

It is noted that the frame_header_bits (see also equation (20) above) can be calculated in a similar fashion. The predetermined rate control function can then add the texture_bits to the frame_header_bits to estimate the bits for the video frame when the selected QP is employed.

As described herein, the rate control update component 230 (see FIG. 2) can update the model parameter, alpha, for the predetermined rate control function, based at least on the actual number of bits used by the coding component 228 (see FIG. 2) to encode a video frame. For example, the rate control update component 230 can perform such updating of the model parameter, alpha, to better adapt the predetermined rate control function to current scene characteristics. In accordance with the illustrative embodiment of FIG. 2, the rate control update component 230 is operative to update the model parameter, alpha, for the predetermined rate control function using a weighted average of current model data and history model data, as follows, $$\text{weight\_alpha} = \text{texture\_bits}/\text{target\_texture\_bits\_MB} * 32.0/\text{picture\_size, and} \quad (22)$$

$$\text{alpha} = (1.0 - \text{weight\_alpha}) * \text{prev\_alpha} + \text{weight\_alpha} * \text{cur\_alpha}, \quad (23)$$

in which "weight_alpha" corresponds to the weight of the model parameter, alpha, (calculated using the data from the video frame that was just encoded), "target_texture_bits_MB" corresponds to the target texture bits to be allocated per MB, "picture_size" corresponds to the size of a current video frame, "prev_alpha" corresponds to a previous model parameter, alpha, and "cur_alpha" corresponds to a current model parameter, alpha, which has been calculated using the data from the just encoded video frame. It is noted that the weight_alpha value is typically bounded by a minimum value of about 0.1 and a maximum value of about 0.8. Such a weight_alpha value can be derived using the actual encoding statistics to assure that a reasonable weight is given to the cur_alpha, and to assure that such updating of the model parameter, alpha, is performed smoothly. It is further noted that the model header bits (also referred to herein as a/the "header_bits") can be updated, as follows, $$\text{header\_bits} = 0.5 * \text{prev\_header\_bits} + 0.5 * \text{current\_header\_bits}, \quad (24)$$

in which "prev_header_bits" corresponds to previous model header bits, and "current_header_bits" corresponds to current model header bits, which have been calculated using the data from the just encoded video frame.

In the exemplary video transcoding system 100 of FIG. 1, the video encoder 108 employs the frame complexity information from the look-ahead bitstream analyzer 110 to improve the allocation of bits to the video frames in the input bitstream. Because the input bitstream has been pre-encoded by the external video encoder 112, the quality of the input bitstream may be less than optimal. Further, the pre-encoded input bitstream might not convey reliable information that can be reused by the video encoder 108. For example, a video frame type mismatch between the input bitstream and the video encoder 108 might cause a transcoded I-frame to have decreased perceptual quality, resulting in a "flickering" in the output bitstream, as perceived by the end user.

Figure 10:
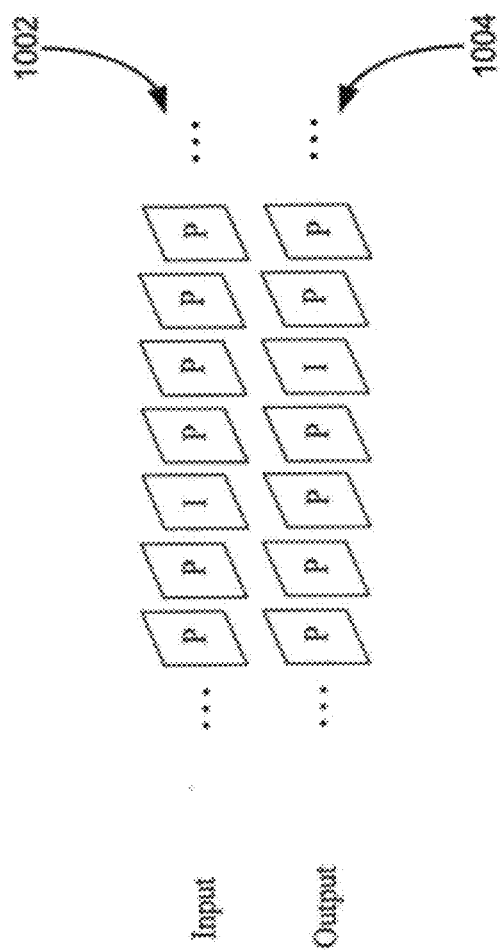
FIG. 10 is a diagram illustrating exemplary video frame types included in an exemplary input video bitstream and an exemplary output video bitstream.

FIG. 10 depicts an exemplary video frame type mismatch scenario, in which video frame types in a series of video frames 1002 from an exemplary input bitstream are different from the video frame types in a corresponding series of video frames 1004 from an exemplary output bitstream. As shown in FIG. 10, the video frame types in the series of video frames 1002 from the input bitstream include, from left to right, 2

P-frames followed by 1 I-frame, which I-frame, in turn, is followed by 4 P-frames. In contrast, the video frame types in the series of video frames 1004 from the output bitstream include, from left to right, 4 P-frames followed by 1 I-frame, which I-frame, in turn, is followed by 2 P-frames.

For example, the 1 I-frame from the series of video frames 1002 (see FIG. 10) may have been encoded as a single P-frame in the series of video frames 1004 (see FIG. 10) by the video transcoding system 100 (see FIG. 1). In such a case, the look-ahead bitstream analyzer 110 may have calculated the frame complexity of the 1 I-frame in the series of video frames 1002, but may not have calculated the frame complexity for the corresponding single P-frame in the series of video frames 1004. To address this issue, the video encoder 108 is operative to estimate the frame complexity of the single P-frame in the series of video frames 1004 using previously encoded P-frames in the same scene as that P-frame. It is noted that the single P-frame in the series of video frames 1004 and the previously encoded P-frames in the same scene would typically have similar video frame characteristics and similar frame complexities. Alternatively, 1 P-frame from the series of video frames 1002 (see FIG. 10) may have been encoded as a single I-frame in the series of video frames 1004 (see FIG. 10) by the video transcoding system 100 (see FIG. 1), resulting in reduced quality for the single I-frame in the series of video frames 1004. To address this issue, the video encoder 108 is operative to estimate the frame complexity of the single I-frame in the series of video frames 1004 as a weighted average of the frame complexity of the 1 P-frame, and the frame complexity of a previous I-frame. For example, the video encoder 108 may employ such an approach for periodical I-frames in the same scene, in which the periodical I-frames have similar video frame characteristics.

In accordance with the illustrative embodiments of FIGS. 1 and 2, the video encoder 108 within the video transcoding system 100 is operative to employ video frame characteristics to calculate the frame complexities for I-frames, in the video frame type mismatch scenario of FIG. 10. It is noted that the video encoder 108 may also employ average 4×4 SATD values as a reflection of the respective frame complexities of such I-frames. Accordingly, in the video frame type mismatch scenario of FIG. 10, the frame complexity of a respective I-frame can be obtained from the look-ahead bitstream analyzer 110 if no such video frame type mismatch occurs, or can be calculated within the video encoder 108 if such video frame type mismatch is present.

Figure 11:
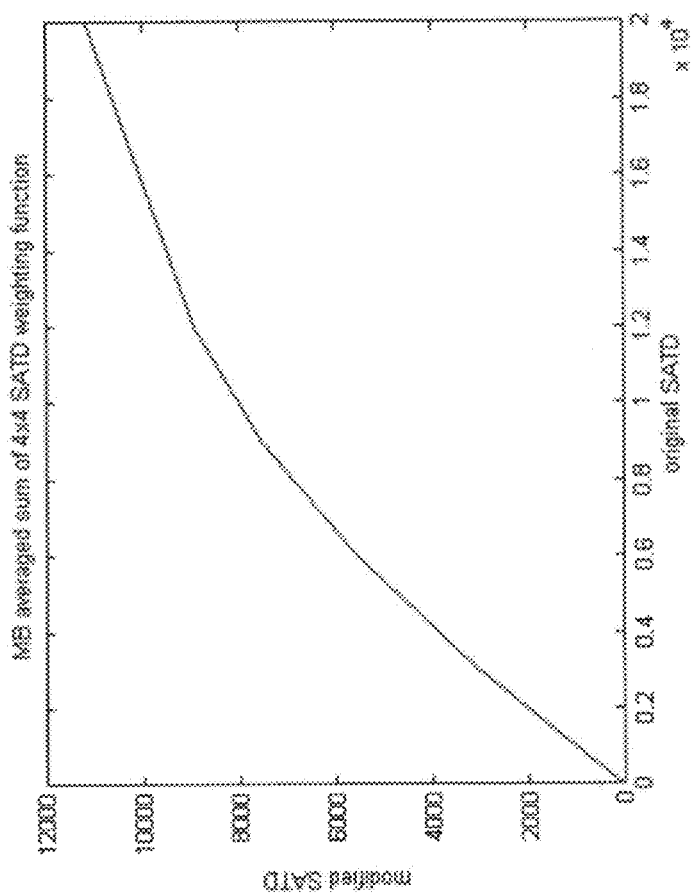
FIG. 11 is a graph illustrating an exemplary piecewise linear function employed by the video encoder of FIG. 2 to weight SATD values.

The time difference from the previous I-frame to a current I-frame (this time difference also referred to herein as an/the "elapse_prevI") can be measured with the video encoder 108, and used to determine whether the current I-frame is likely to have a frame complexity similar to that of the previous I-frame, even if no scene change is detected. It is noted that the bits for the previous I-frame and the bits for the current I-frame might not be proportional to the average SATD values for the respective I-frames. For this reason, the video encoder 108 can weight the SATD values by a piecewise linear function using a smaller slope in the higher SATD regions, thereby increasing the accuracy of the estimates of the I-frame bits. FIG. 11 depicts an exemplary such piecewise linear function, from 4×4 SATD per MB to modified SATD (also referred to herein as an/the "$SATD_{mod}$") per MB. The video encoder 108 can employ a weighted average of a modified SATD value of the previous I-frame (such value also referred to herein as an/the "$SATD_{mod\_prev}$") and a modified SATD value of the current I-frame (such value also referred to herein as an/the "$SATD_{mod\_curr}$"), to obtain an estimate of the frame complexity of an I-frame, as follows, $$I\_complexity = prev\_I\_complexity * (\gamma * SATD_{mod\_curr} + (1-\gamma) * SATD_{mod\_prev}) / SATD_{mod\_prev} \quad (25)$$

in which "I_complexity" corresponds to the frame complexity of the current I-frame, and "prev_I_complexity" corresponds to the frame complexity of the previous I-frame. Further, "$\gamma$" is a weighting parameter that can be obtained as follows:

1) if the current video frame is an I-frame indicative of a scene change, then the weighting parameter, $\gamma$, can be set to 0.8, or any other suitable value; and 2) if the current video frame is an I-frame that is not indicative of a scene change, then the weighting parameter, $\gamma$, can be calculated, as follows, $$\gamma = \min[0.8, (elapse\_prevI+1)/8], \quad (26)$$

in which the elapse_prevI is measured in seconds. It is noted that equation (26) above indicates that a reduced weight is given to the frame complexity of the previous I-frame, with an increased elapsed time.

An exemplary configuration of an exemplary video transcoding scenario is described below with reference to TABLE I, as follows.

TABLE I

| | scene_change_CIF | |
|---|---|---|
| Input | h264 | |
| Output | h264 | |
| Size | 352 × 288 | |
| Frame rate | 30 frames per second | |
| Bitrate | 300 kilobits per second | |
| Buffer | 5 seconds | |
| B frame | 0 | |
| Profile | High Profile | |
| Entropy coding | CABAC | |
| Rate control mode | w/o look-ahead | w/ look-ahead |

In this exemplary video transcoding scenario, an exemplary input sequence is pre-coded in a constant quality mode with a QP of 20 to create an exemplary input bitstream. Further, the input bitstream is provided as an input to the video transcoding system 100 (see FIG. 1) employing a look-ahead approach to video transcoding, thereby generating an output bitstream in the H.264 coding format at 300 kilobits per second (kbps) and 30 frames per second (fps).

Figure 12A:
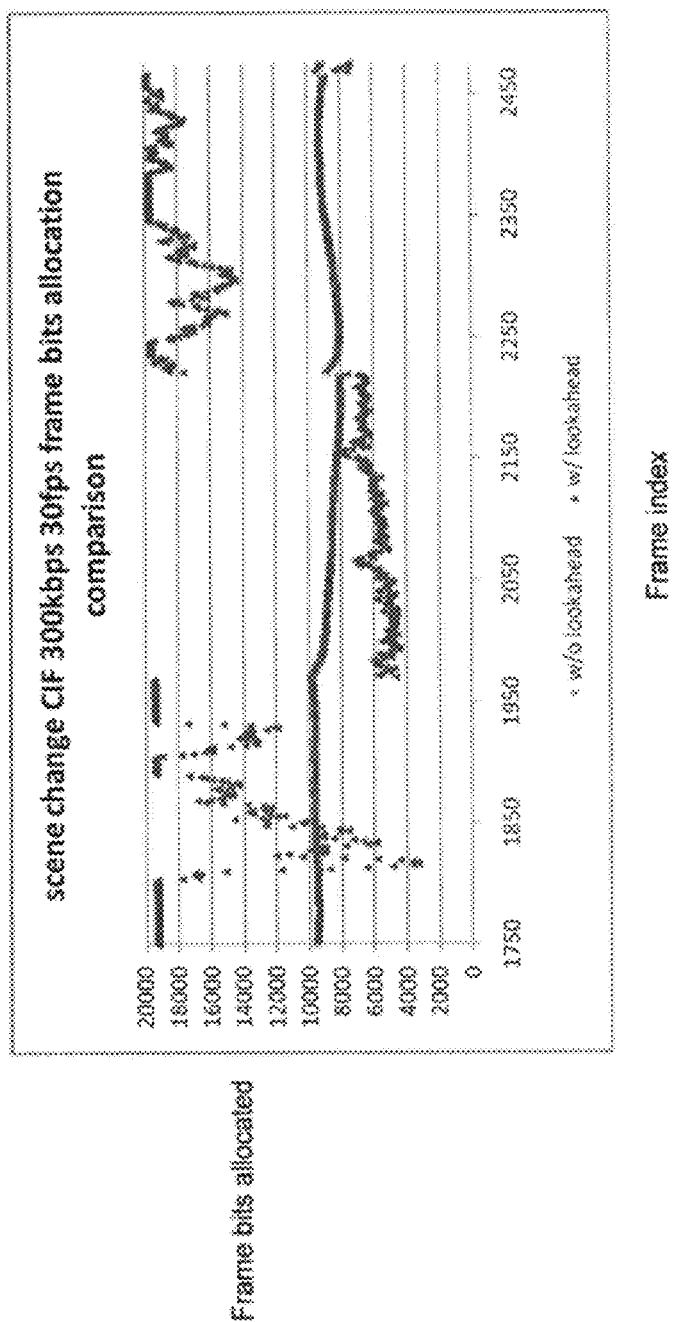
FIG. 12a is a graph illustrating exemplary bit allocations for video frames in an exemplary output bitstream using the exemplary look-ahead approach to video transcoding employed by the video transcoding system of FIG. 1, as compared to a conventional video transcoding system not employing a look-ahead approach.

FIG. 12*a* depicts exemplary bit allocations for video frames in the output bitstream using the herein described look-ahead approach to video transcoding ("w/ look-ahead"), and using a conventional video transcoding approach ("w/o look-ahead"). As shown in FIG. 12*a*, using the conventional video transcoding approach, a similar amount of bits is allocated to a video frame regardless of the frame complexity. In contrast, using the herein described look-ahead approach to video transcoding, the actual frame complexities of the video frames from the look-ahead bitstream analyzer 110 are employed to allocate bits more efficiently, so that more complicated video frames are allocated more bits, and less complicated video frames are allocated fewer bits.

Figure 12B:
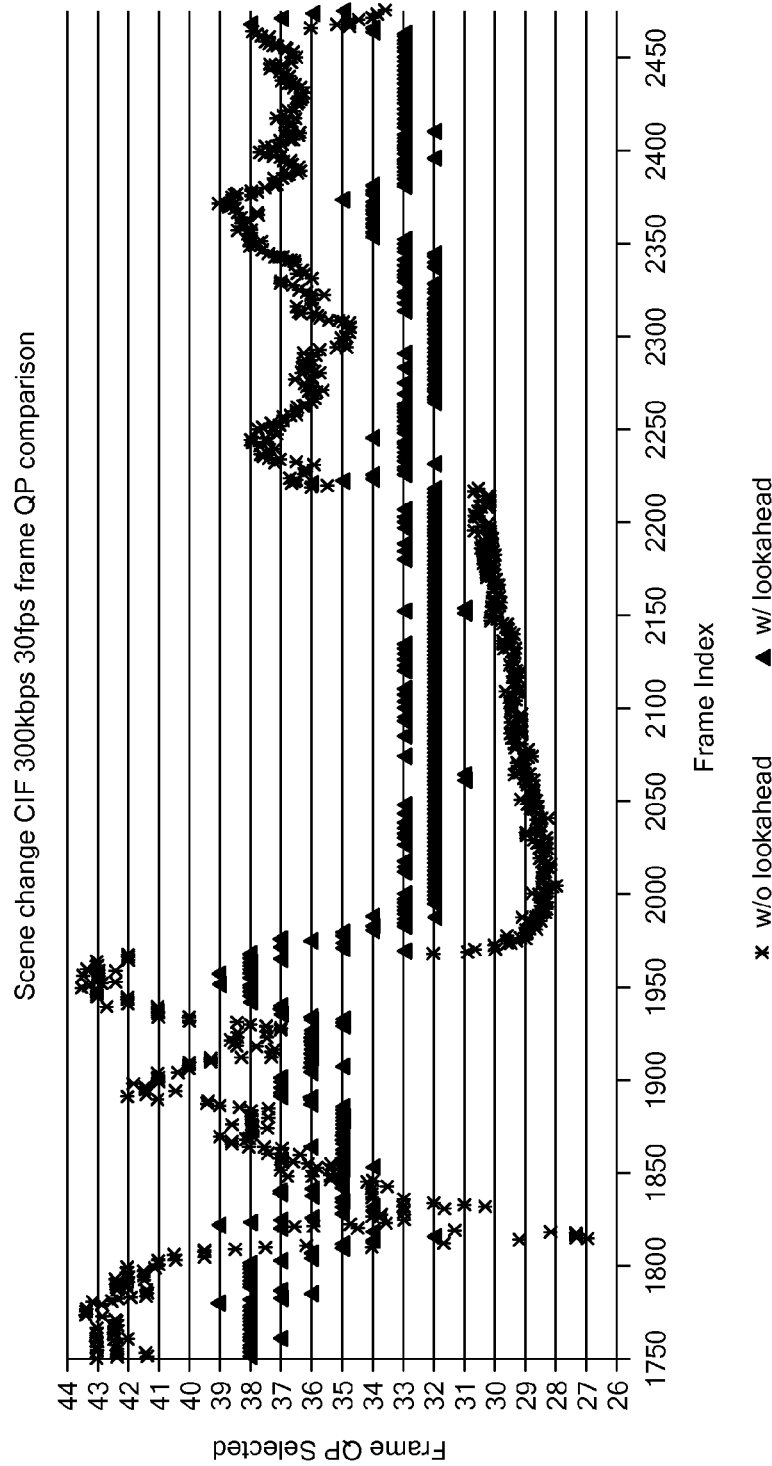
FIG. 12b is a graph illustrating exemplary QP selections for the video frames in the output bitstream of FIG. 12a using the exemplary look-ahead approach to video transcoding employed by the video transcoding system of FIG. 1, as compared to a conventional video transcoding system not employing a look-ahead approach.

FIG. 12*b* depicts exemplary QP selections for the video frames in the output bitstream using the herein described look-ahead approach to video transcoding (w/ look-ahead), and using a conventional video transcoding approach (w/o look-ahead). It is noted that smooth QP fluctuations generally result in improved perceptual quality. As shown in FIG. 12*b*, such QP fluctuations are significantly smoother using the herein described look-ahead approach to video transcoding (w/look-ahead), in comparison to the QP fluctuations resulting from use of the conventional video transcoding approach (w/o look-ahead).

Figure 13:
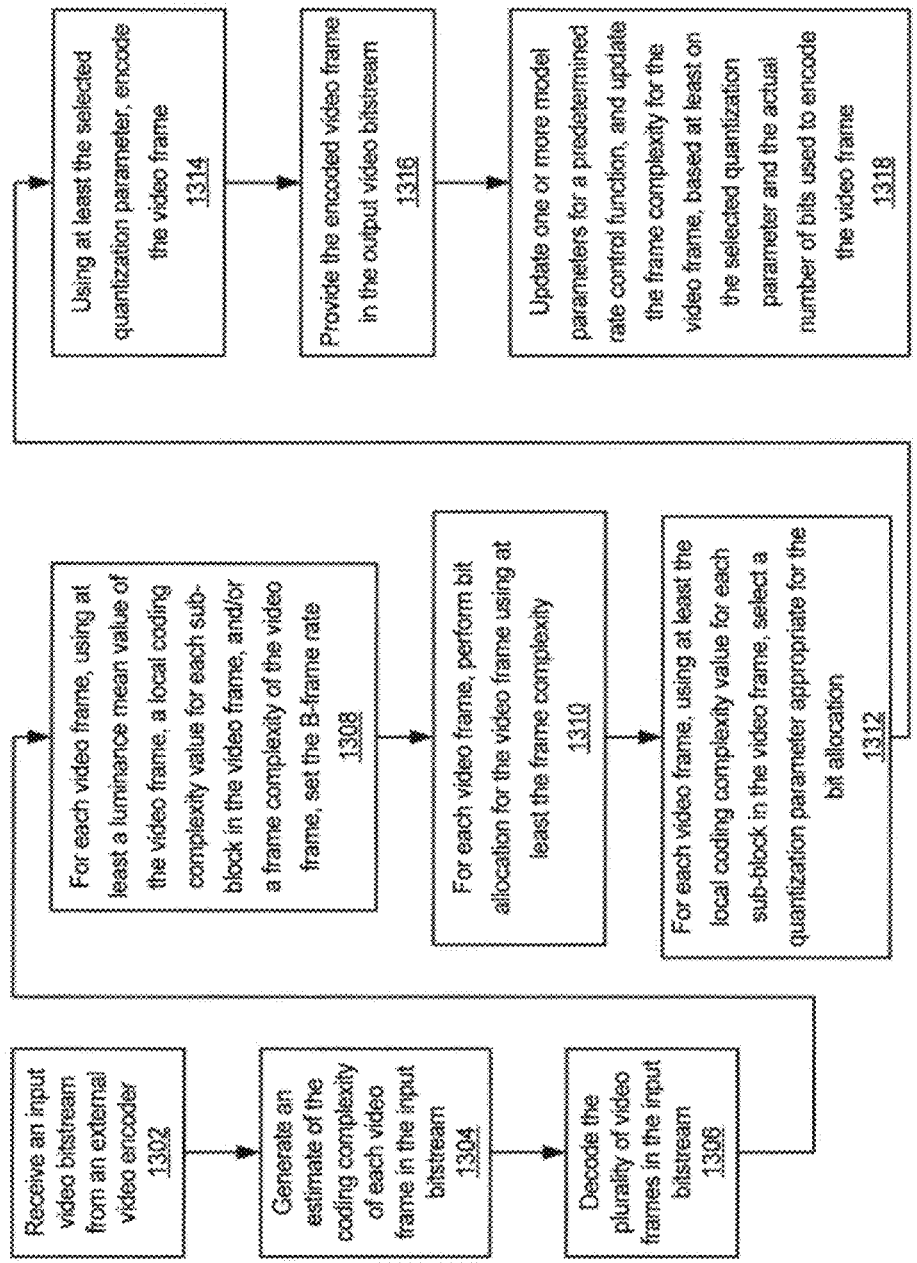
FIG. 13 is a flow diagram of an exemplary method of operating the video transcoding system of FIG. 1.

An illustrative method of operating the video transcoding system 100 of FIG. 1 is described below with reference to FIG. 13, as well as FIG. 1. As depicted in step 1302, an input video bitstream is received from the external video encoder 112 by the video transcoding system 100. As depicted in step 1304, an estimate of the coding complexity of each of at least some of a plurality of video frames in the input bitstream is generated by the look-ahead bitstream analyzer 110. As depicted in step 1306, the plurality of video frames in the input bitstream are decoded by the video decoder 104. As depicted in step 1308, the B-frame rate is set by the video encoder 108 for the video frame, using at least a luminance mean value of the video frame, a local coding complexity value for each sub-block in the video frame, and/or a frame complexity of the video frame. As depicted in step 1310, bit allocation is performed by the video encoder 108 for the video frame, using at least the frame complexity of the video frame. As depicted in step 1312, a quantization parameter is selected by the video encoder 108 for the video frame, using at least the local coding complexity value for each sub-block in the video frame. As depicted in step 1314, the video frame is encoded by the video encoder 108, using at least the selected quantization parameter. As depicted in step 1316, the encoded video frame is provided in the output video bitstream by the video encoder 108. As depicted in step 1318, one or more rate estimation model parameters for a predetermined rate control function are updated, and the frame complexity for the video frame is updated, by the video encoder 108, based at least on the selected quantization parameter and the actual number of bits used to encode the video frame.

It is noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of performing rate control in a video transcoding system, comprising the steps of:
   receiving an input video bitstream including a plurality of video frames encoded in a first coding format;
   obtaining, at a look-ahead bitstream analyzer, frame coding complexity information for at least some of the plurality of video frames;
   for each of at least some of the plurality of video frames:
      decoding the video frame, the video frame including a plurality of macroblocks;
      obtaining local coding complexity information for each of at least some of the plurality of macroblocks included in the video frame;
      performing bit allocation for the video frame using at least some of the frame coding complexity information obtained at the look-ahead bitstream analyzer;
      selecting a quantization parameter (QP) appropriate for the bit allocation using at least the local coding complexity information for the video frame; and
      using the selected QP, encoding the video frame in a second coding format as one of a predictive frame (P-frame), an intra-coded frame (I-frame), and a bidirectional predictive frame (B-frame);
   having encoded at least some of the plurality of video frames in the second coding format as P-frames or I-frames, adaptively modifying a B-frame rate between at least one pair of P-frames or I-frames based at least on local coding complexity information obtained for a current video frame included in the plurality of video frames; and
   providing the plurality of video frames encoded in the second coding format in an output video bitstream.

2. The method of claim 1 further comprising:
   analyzing characteristics of the current video frame using one or more of the frame coding complexity information obtained at the look-ahead bitstream analyzer and the local coding complexity information for the current video frame.

3. The method of claim 2 wherein the modifying of the B-frame rate between the pair of P-frames or I-frames includes modifying the B-frame rate based on the analyzed characteristics of the current video frame, the modifying of the B-frame rate further including:
   having encoded a respective one of the plurality of video frames in the second coding format as a P-frame or an I-frame, obtaining the local coding complexity information for the current video frame;
for the current video frame, normalizing the local coding complexity information for a predetermined QP;
obtaining average local coding complexity information for the plurality of video frames;
updating the average local coding complexity information as a weighted average of the average local coding complexity information and the normalized local coding complexity information;
obtaining weighted complexity information as a function of the updated coding complexity information obtained at the look-ahead bitstream analyzer;
performing a comparison of the weighted complexity information and one or more predetermined threshold values; and
modifying the B-frame rate based at least on a result of the comparison.

4. The method of claim 1 wherein the receiving of the input video bitstream comprises receiving of the input video bitstream from an external video encoder.

5. The method of claim 1 wherein the input video bitstream contains one or both of slice layer information and macroblock layer information, and wherein the obtaining of the frame coding complexity information comprises:
analyzing one or both of the slice layer information and the macroblock layer information contained in the input video bitstream.

6. The method of claim 5 wherein the obtaining of the frame coding complexity information comprises obtaining the frame coding complexity information using at least one or both of the slice layer information and the macroblock layer information.

7. The method of claim 1 further comprising:
for each of at least some of the plurality of video frames decoded from the input video bitstream, performing one or both of intra prediction processing and inter prediction processing for each macroblock included in the video frame.

8. The method of claim 7 wherein each macroblock included in the video frame includes a plurality of sub-macroblocks, and wherein the performing of the intra prediction processing comprises inferring signal levels representing pixels in a predictive macroblock included in the video frame from signal levels representing pixels in adjacent macroblocks that have already been encoded, and determining differences between the signal levels to obtain residuals for the plurality of sub-macroblocks included in each macroblock of the video frame.

9. The method of claim 8 further comprising:
selecting one of an intra coding mode and an inter coding mode for each macroblock for the video frame based at least on the residuals from the intra prediction processing and the inter prediction processing for the plurality of sub-macroblocks included in the macroblock.

10. The method of claim 9 further comprising:
performing integer pixel motion estimation for predicting motion data in the event the inter coding mode is selected for the video frame.

11. The method of claim 10 further comprising:
performing one of intra coding and inter coding for the video frame, based on the selecting of the intra coding mode or the inter coding mode for the video frame, thereby generating one or both of a plurality of intra-coded macroblocks and a plurality of inter-coded macroblocks for an inter coding mode frame.

12. The method of claim 11 further comprising:
detecting a scene change in an input video sequence based at least on a ratio of the intra-coded macroblocks and inter-coded macroblocks.

13. The method of claim 12 wherein the detecting of the scene change in the input video sequence comprises:
obtaining a luminance mean value of the video frame;
obtaining a difference between the luminance mean value of the video frame and a luminance mean value of a previous video frame in the input video sequence;
in the event the difference between the luminance mean value of the video frame and the luminance mean value of the previous video frame is less than a predetermined low threshold value, detecting no scene change in the input video sequence; and
in the event the difference between the luminance mean value of the video frame and the luminance mean value of the previous video frame is greater than a predetermined high threshold value, detecting the scene change in the input video sequence.

14. The method of claim 13 wherein the detecting of the scene change in the input video sequence comprises, in the event the difference between the luminance mean value of the video frame and the luminance mean value of the previous video frame is greater than the predetermined low threshold value and is less than the predetermined high threshold:
determining a number of intra-coded macroblocks in the video frame;
in the event the number of intra-coded macroblocks is greater than a predetermined percentage of a total number of macroblocks in the video frame, detecting a scene change in the input video sequence; and
in the event the number of intra-coded macroblocks is less than the predetermined percentage of the total number of macroblocks in the video frame, detecting no scene change in the input video sequence.

15. The method of claim 12 further comprising, in the event the scene change is detected in the input video bitstream:
resetting one or more rate estimation model parameters in a predetermined rate control function.

16. The method of claim 15 further comprising:
updating the rate estimation model parameters based at least on the selected QP and a total number of bits used to encode the video frame.

17. The method of claim 16 further comprising: updating the frame coding complexity information based at least on the total number of bits used to encode the video frame.

18. The method of claim 1 further comprising:
incorporating a predetermined number of video frames of delay in the input video bitstream.

19. The method of claim 1 further comprising, for each of at least some of the plurality of video frames that are encoded:
determining a type of the video frame.

20. The method of claim 19 wherein the determining of the type of the video frame comprises determining types of a predetermined number of the plurality of video frames.

21. The method of claim 20 further comprising:
forming a set of video frames based on the types of the predetermined number of the plurality of video frames.

22. The method of claim 21 wherein the set of video frames includes the video frame, and wherein the performing of the bit allocation for the video frame comprises performing bit allocations for the set of video frames.

23. The method of claim 22 wherein the set of video frames includes a P-frame or an I-frame, followed by one or more B-frames.

24. The method of claim 19 wherein the providing of the video frames encoded in the second coding format comprises, in the event the type of the video frame is a B-frame, reordering the plurality of video frames that are encoded.

25. The method of claim 19 further comprising, for each of at least some of the plurality of video frames that are encoded:
in the event the type of the video frame is an I-frame, forming a group of pictures, the group of pictures including the video frame.

26. A video transcoding system, comprising:
a look-ahead bitstream analyzer operative:
to receive an input video bitstream, the input video bitstream including a plurality of video frames in an input video sequence, each video frame including a plurality of macroblocks, the plurality of video frames being encoded in a first coding format; and
to obtain frame coding complexity information for at least some of the plurality of video frames;
a video decoder operative to receive the input video bitstream including the plurality of video frames, and, for each of at least some of the plurality of video frames, to decode the video frame; and
a video encoder operative to receive the decoded video frames, and, for each of at least some of the decoded video frames:
to obtain local coding complexity information for each of at least some of the plurality of macroblocks included in the video frame;
to perform bit allocation for the video frame using at least some of the frame coding complexity information obtained at the look-ahead bitstream analyzer;
to select a quantization parameter (QP) appropriate for the bit allocation using at least the local coding complexity information for the video frame; and
using the selected QP, to encode the video frame in a second coding format as one of a predictive frame (P-frame), an intra-coded frame (I-frame), and a bidirectional predictive frame (B-frame),
wherein the video encoder is further operative:
having encoded at least some of the plurality of video frames in the second coding format as P-frames or I-frames, to adaptively modify a B-frame rate between at least one pair of P-frames or I-frames based at least on local coding complexity information obtained for a current video frame received at the video encoder; and
to provide the plurality of video frames encoded in the second coding format in an output video bitstream.

27. The system of claim 26 wherein the video encoder is further operative to analyze characteristics of the current video frame using one or more of the frame coding complexity information obtained at the look-ahead bitstream analyzer and the local coding complexity information for the current video frame.

28. The system of claim 27 wherein the video encoder is further operative to modify the B-frame rate between the pair of P-frames or I-frames based on the analyzed characteristics of the current video frame by:
having encoded a respective one of the plurality of video frames in the second coding format as a P-frame or an I-frame, obtaining the local coding complexity information for the current video frame;
for the current video frame, normalizing the local coding complexity information for a predetermined QP;
obtaining average local coding complexity information for the plurality of video frames;
updating the average local coding complexity information as a weighted average of the average local coding complexity information and the normalized local coding complexity information;
obtaining weighted complexity information as a function of the updated coding complexity information obtained at the look-ahead bitstream analyzer;
performing a comparison of the weighted complexity information and one or more predetermined threshold values; and
modifying the B-frame rate based at least on a result of the comparison.

29. A video transcoding system, comprising:
a look-ahead bitstream analyzer operative:
to receive an input video bitstream, the input video bitstream including a plurality of video frames in an input video sequence, each video frame including a plurality of macroblocks, the plurality of video frames being encoded in a first coding format; and
to obtain frame coding complexity information for at least some of the plurality of video frames;
a video decoder operative to receive the input video bitstream including the plurality of video frames, and, for each of at least some of the plurality of video frames, to decode the video frame; and
a video encoder operative to receive the decoded video frames, and, for each of at least some of the decoded video frames:
to obtain local coding complexity information for each of at least some of the plurality of macroblocks included in the video frame;
to perform bit allocation for the video frame using at least some of the frame coding complexity information obtained at the look-ahead bitstream analyzer;
to select a quantization parameter (QP) appropriate for the bit allocation using at least the local coding complexity information for the video frame; and
using the selected QP, to encode the video frame in a second coding format as one of a predictive frame (P-frame), an intra-coded frame (I-frame), and a bidirectional predictive frame (B-frame),
wherein the video encoder is further operative:
having encoded a respective one of the plurality of video frames in the second coding format as a P-frame or an I-frame, to obtain local coding complexity information for a current video frame received at the video encoder;
for the current video frame, to normalize the local coding complexity information for a predetermined QP;
to obtain average local coding complexity information for the plurality of video frames;
to update the average local coding complexity information as a weighted average of the average local coding complexity information and the normalized local coding complexity information;
to obtain weighted complexity information as a function of the updated average local coding complexity information and at least some of the frame coding complexity information obtained at the look-ahead bitstream analyzer;
to perform a comparison of the weighted complexity information and one or more predetermined threshold values;
to modify the B-frame rate between at least one pair of P-frames or I-frames based at least on a result of the comparison; and to provide the plurality of video frames encoded in the second coding format in an output video bitstream.

30. The system of claim 29 wherein the video encoder is further operative, for each of at least some of the decoded video frames, to determine types of a predetermined number of the plurality of video frames.

31. The system of claim 30 wherein the video encoder is further operative to form a set of video frames based on the types of the predetermined number of the plurality of video frames.

32. The system of claim 31 wherein the set of video frames includes the video frame, and wherein the video encoder is further operative to perform bit allocations for the set of video frames.

33. The system of claim 32 wherein the set of video frames includes a P-frame or an I-frame, followed by one or more B-frames.

* * * * *